United States Patent
Helbig, Sr.

(10) Patent No.: US 6,564,326 B2
(45) Date of Patent: May 13, 2003

(54) METHOD AND APPARATUS FOR ENHANCING COMPUTER SYSTEM SECURITY

(76) Inventor: Walter A. Helbig, Sr., 186 Nahma Trail, Medford Lakes, NJ (US) 08055

( * ) Notice: Subject to any disclaimer, the term of this patent is extended or adjusted under 35 U.S.C. 154(b) by 0 days.

(21) Appl. No.: 10/055,786

(22) Filed: Oct. 24, 2001

(65) Prior Publication Data

US 2002/0166062 A1 Nov. 7, 2002

Related U.S. Application Data

(63) Continuation of application No. 09/348,095, filed on Jul. 6, 1999, now Pat. No. 6,311,273.

(51) Int. Cl.[7] .............................. G06F 11/30; H02H 3/05
(52) U.S. Cl. ........................... 713/200; 714/46; 714/47; 714/39; 714/9
(58) Field of Search ................................. 713/200, 201; 714/46, 47, 9, 39

(56) References Cited

U.S. PATENT DOCUMENTS

| 5,113,522 | A |   | 5/1992  | Dinwiddie, Jr. et al. |         |
|-----------|---|---|---------|-----------------------|---------|
| 5,121,345 | A |   | 6/1992  | Lentz                 |         |
| 5,144,659 | A |   | 9/1992  | Jones                 |         |
| 5,214,695 | A |   | 5/1993  | Arnold et al.         |         |
| 5,237,699 | A |   | 8/1993  | Little et al.         |         |
| 5,263,147 | A |   | 11/1993 | Francisco et al.      |         |
| 5,283,828 | A |   | 2/1994  | Saunders et al.       |         |
| 5,392,436 | A |   | 2/1995  | Jansen et al.         |         |
| 5,475,839 | A |   | 12/1995 | Watson et al.         |         |
| 5,509,120 | A |   | 4/1996  | Merkin et al.         |         |
| 5,511,184 | A |   | 4/1996  | Lin                   |         |
| 5,542,044 | A |   | 7/1996  | Pope                  |         |
| 5,564,054 | A |   | 10/1996 | Bramnick et al.       |         |
| 5,581,794 | A |   | 12/1996 | Lin et al.            |         |
| 5,598,531 | A |   | 1/1997  | Hill                  |         |
| 5,630,057 | A |   | 5/1997  | Hait                  |         |
| 5,671,367 | A |   | 9/1997  | LeRoux                |         |
| 5,734,819 | A |   | 3/1998  | Lewis                 |         |
| 5,953,502 | A | * | 9/1999  | Helbig, Sr.           | 395/186 |
| 6,038,667 | A |   | 3/2000  | Helbig, Sr.           |         |
| 6,311,273 | B1| * | 10/2001 | Helbig, Sr. et al.    | 713/200 |

FOREIGN PATENT DOCUMENTS

| WO | WO-91/13403 A1 | 9/1991  |
| WO | WO-92/21087 A1 | 11/1992 |
| WO | WO-94/12923 A2 | 6/1994  |

* cited by examiner

Primary Examiner—Norman M. Wright
(74) Attorney, Agent, or Firm—Morgan, Lewis & Bockius LLP

(57) ABSTRACT

A security enhanced computer system arrangement includes a coprocessor and a multiprocessor logic controller inserted into the architecture of a conventional computer system. The coprocessor and multiprocessor logic controller is interposed between the CPU of the conventional computer system to intercept and replace control signals that are passed over certain of the critical control signal lines associated with the CPU. The multiprocessor logic controller arrangement thereby isolates the CPU of the conventional computer system from the remainder of the conventional computer system, permitting separate control over the CPU and separate control over the remainder of the computer system. By controlling the control signals that are normally passed between the CPU and the remainder of the computer system, the multiprocessor logic controller permits the coprocessor to perform highly secure operations. These secure operations, selectable by a trusted operator or built in to a cooperating operating system, verify that the computer system is a trusted computing base which can be relied upon to perform its operations properly and without compromise.

42 Claims, 10 Drawing Sheets

FIG. 10

| CRITICAL PROGRAM (1002) | VERIFICATION TIMING (1004) | VERIFICATION OPTION (1012) |
|---|---|---|
| BIOS | AFTER HARDWARE TEST, PRIOR TO SYSTEM INITIALIZATION (AUTOMATIC OR MANUAL) (1006) | AUTOMATIC |
| INTERRUPT TABLE | | MANUAL |
| DOS | AFTER SYSTEM INITIALIZATION, PRIOR TO OPERATING SYSTEM BOOT (AUTOMATIC OR MANUAL) (1008) | |
| AUTOEXEC.BAT | | |
| CONFIG.SYS | AFTER OPERATING SYSTEM BOOT AT THE REQUEST OF THE OPERATOR (MANUAL) (1010) | |

METHOD AND APPARATUS FOR ENHANCING COMPUTER SYSTEM SECURITY

"This application is a continuation of copending application(s) application Ser. No. 09/348,095 filed on Jul. 6, 1999"

FIELD OF THE INVENTION

The present invention relates to the field of computer security and the ability to detect and/or prevent breaches of computer security.

BACKGROUND OF THE INVENTION

Computer systems are subject to attack by intruders who seek to steal or corrupt valuable data or programs. Attackers have various techniques for defeating security measures and gaining access to computer system resources. Attacks generally depend on changing the content of some critical portion of the computer control software. One example is to change an entry in the table of interrupt vectors to redirect execution to a planted program when the affected interrupt executes. Other types of attacks involve rewriting portions of the hard disk boot sector, or modifying the BIOS software. In each case, execution of the planted program gives the attacker access to the computer system.

One of the ways to prevent intrusion is to protect areas of the RIM or disk memory space containing critical portions of the computer control software from being overwritten, except under specified conditions. In some computer architectures, the software address space is divided into two or more protection rings. Preventative protection measures are often quite complex and generally contain a weak link an attacker can exploit to circumvent the protection measures. For example, in the UNIX operating system, which uses a two ring architecture, there is a facility for inner ring root access for processes running in the less privileged outer ring. Since processes in the outer ring can run as root processes in the protected inner ring memory space, it remains possible to modify the portion of the computer control software which controls protected memory.

In the IBM compatible PC standard running DOS, which uses the processor's ringless real addressing mode, there is no architectural constraint preventing any program from corrupting the system software. Even using the real and protected addressing modes of the Intel 386 and later microprocessors, it is generally possible to access real mode from protected mode, thus forming a back door for bypassing the security features set up in protected mode. The foregoing measures are designed for preventing intrusion. Detecting intrusion after the fact, presents a different class of problems.

One of the ways to detect whether an intrusion has occurred, is to check whether any critical portion of the computer control software has been altered. Generally, to detect the alteration of a file, a digital signature for that file is computed using any one of a variety of techniques, such as a nonreversible hashing algorithm, such as described by the National Institute of Standards and Technology, "Secure Hash Standard", FIPS PUB 180–1, published Apr. 17, 1995. A digital signature of this type is also known as a modification detection code (MDC), a manipulation authentication code (MAC) or a message digest. The described hash standard is called secure because it is computationally infeasible to find a message which corresponds to a given message digest, or to find two different messages which produce the same message digest. A system using modification detection codes to verify system software and trusted application programs is shown in U.S. Pat. No. 5,421,006.

A trusted operator initiates the computation of a digital signature for each critical portion of the computer control software or data. Note that the critical program area or control software can be either an executable program or critical system data (e.g. a table of data entries). The resulting set of digital signatures is stored in a secure area of memory. At a later time, the system can be checked by recomputing the digital signatures of the same critical portions of the computer control software or data, and comparing each recomputed digital signature to a corresponding previously stored digital signature. If the recomputed digital signatures are not the same as the originally computed digital signatures, an error condition is flagged to the user, indicating the detection of intrusion tampering.

However, it cannot be guaranteed that an attacker has not altered the operation of the security sequence itself, which would defeat the tamper detection system. For example, on power up or system reset, the computer will initialize the system using its BIOS memory contents, which contents have not been checked for alterations. In the above cited U.S. Pat. No. 5,421,006 the boot record loaded by running BIOS is checked, but BIOS itself is not verified before it is run. Similarly, BIOS extensions are run without verification. Also in the cited patent, BIOS is shown as stored in read only memory, while modern architectures use EEROM for BIOS storage, which is electrically alterable. Running BIOS and its extensions on start up without verification (regardless of a later signature check) remains a potential weak link which can be exploited to gain entry.

Defensively preventing breaches of computer security, and detecting breaches of security are separate, but related goals. Computer security systems which defensively prevent substantially all breaches of computer security will remain an elusive goal as long as the system can be connected to another computer that is insecure. Real time or near real time detection of security breaches must be rapid enough to initiate shut down procedures and prevent further entry, before any damage occurs. Reliable detection alone will not prevent the breach but will limit the damage by promptly reporting it, and providing an audit trail. It would be desirable to provide a detection system which reliably detects substantially all breaches of computer security. Detecting a breach would also include the detection of any attacks upon the detection system. For this purpose, the detection system itself must be sufficiently impervious to attack to enable the detection system to complete its critical function, i.e., to detect the attack.

SUMMARY OF THE INVENTION

In accordance with the present invention, a coprocessor arrangement is inserted into the architecture of a conventional computer system in a novel manner. In particular, the coprocessor arrangement is interposed between the central processor unit (CPU) and the remainder of the computer system enabling the coprocessor to prevent certain critical control signal lines from passing between the two. In such manner, the coprocessor arrangement isolates the CPU of the conventional computer system from the remainder of the computer system, thus permitting the coprocessor to obtain separate control over both the CPU and the remainder of the computer system. By isolating the CPU control signals from the remainder of the computer system, the coprocessor can interrupt the normal computer system operation at any time to check digital signatures of any firmware or software in the computer system before it is used either the first time or any time thereafter.

The present system can be retrofitted, for example, into an existing PC system having an Intel type I486 microprocessor chip as the CPU, by removing the CPU from its socket on the mother board, and inserting an ASIC (Application Specific Integrated Circuit) a daughter board or other form of multi-chip module (MCM), into the empty CPU socket. The removed I486 is reinserted into a socket on the daughter board. The control signals to/from the CPU are passed through logic on the daughter board which intercepts the normal CPU control signals and substitutes other control signals as required for the coprocessor to operate. The CPU is released by allowing control signals to again pass between it and the computer system. Data and address signals are directly connected through lines on the daughter board between the CPU and the computer system as well as to the logic on the daughter board. In future systems, the go functions of the daughter board can be partially or totally built into the mother board, and/or integrated in whole or in part, into future integrated circuit microprocessors.

The daughter board further contains a coprocessor subsystem in the form of a RISC microprocessor chip, and a multiprocessor logic controller. The multiprocessor logic controller is a finite state machine controlled by hardware and implemented by one or more field programmable gate arrays (FPGA's) and by firmware in one or more non-volatile memory IC's. The multiprocessor logic controller determines when to disconnect and when to reconnect the associated control signal lines to and from the CPU and the remainder of the conventional PC computer system. During the times when the CPU is disconnected from the remainder of the computer system, the multiprocessor logic controller enables and controls the activities of the CPU and the RISC coprocessor to perform the security checking of the components of the computer system. Disconnection and reconnection of a control signal line may be physical (such as by a relay) optical (such as by an optical coupler), electrical (such as by a solid state switch) or logical (such as by a logic gate). Control signal lines which are bi-directional (carrying control signals to/from the CPU) may be disconnected and substitute control signals interposed in either direction.

For example, the multiprocessor logic controller on the daughter board captures and releases the CPU control signals, and operates the CPU with its own firmware to direct the RISC coprocessor subsystem to generate or verify a digital signature for a given computer file. Towards this end, control over the remainder of the computer system is passed back and forth, according to firmware, between the RISC coprocessor and the CPU by the multiprocessor logic controller. Once the verification of one or more digital signatures is completed, the multiprocessor logic controller then re-establishes the connections between the CPU and the remainder of the computer system, and the system resumes normal PC operation.

In regular computer operation, the CPU receives data and control signals in a normal fashion from the mother board. At the request of the trusted operator, the RISC coprocessor computes digital signatures for files indicated by the trusted operator. The RISC coprocessor stores the digital signatures. Typical files indicated for protection would be the BIOS memory, DOS, the interrupt table, and the autoexec.bat and config.sys files in the root directory. The stored digital signatures represent the secured state of the computer system, i.e., the state of selected critical portions of the computer control software files before any intrusion has taken place. The operation of the circuitry on the daughter board is transparent to normal operation. Each time the system is restarted, a new security check for intrusion is performed.

SYSTEM SECURITY CHECK UPON POWER UP OR SYSTEM RESET

To detect prior intrusion, the RISC processor and the CPU perform an alternating cross check on power up (or following a hard system reset). The multiprocessor logic controller in the daughter board first captures the CPU control signal lines and then causes both the CPU and the daughter board's RISC processor to run their built in self test routines. The CPU then runs firmware stored in a daughter board Flash RAM that commands the RISC coprocessor to run its software directed self test routine. At this point, the CPU suspends operation, and the RISC coprocessor runs its self check routine and other such system checks such as tests of the memories on the daughter board. Upon successful completion of these tests, the RISC coprocessor suspends operation and the CPU resumes operation. If the trusted operator has previously chosen to have the BIOS ROM tested at this point, the CPU will request that the RISC coprocessor perform the BIOS test, and the CPU will suspend its operation while the RISC coprocessor restarts operation to perform the test.

The RISC coprocessor then computes the digital signature (s) for the BIOS on the mother board and compares it with the signature(s) for the BIOS previously generated and stored on the daughter board. If the recomputed digital signature(s) check against the previously computed digital signature(s), the CPU is released and allowed to run other trusted operator specified tests or to begin normal execution of its BIOS to set up all the other machine tables and parameters it needs for normal PC operation.

As the last part of the normal BIOS execution by the CPU, the CPU checks to see whether any of the computer system's components have extensions to the built in BIOS, and then executes those BIOS extensions that are found to be present. Operating as one of the BIOS extensions, the multiprocessor logic controller on the daughter board (through the execution of the daughter board resident BIOS extension), recaptures the CPU (by capturing its control signal lines) before it can execute the system boot up firmware. Then, as directed by previously specified trusted operator selections, the daughter board checks the digital signatures of DOS, the interrupt tables, autoexec.bat and config.sys files (through direct access to the system's RAM and to the hard disk sectors) or any other critical program as preselected by the trusted operator.

If the daughter board multiprocessor logic controller system verifies all digital signatures of the system components as specified by the trusted operator, the CPU is released and the system allowed to boot and run normally. From this point, the presence of the daughter board is transparent to the operation of the computer system.

Any past attack on the computer system which altered any portions of the computer's BIOS firmware designated for protection by the trusted operator would show up as an error condition upon the next system reset or power up. Any attack on any of the computer's BIOS extension firmware or any critical software designated for protection by the trusted operator would show up as an error condition upon the next system reset of any kind, be it a hard reset or a soft reset (a reset commanded by the simultaneous CTRL-ALT-DEL) keystrokes. In such manner, an intrusion representing a possible breach of computer security is detected.

MONITORING OPERATION

In accordance with a second aspect of the present invention, the coprocessor arrangement may be utilized as a security monitor. To monitor security, the multiprocessor logic controller on the daughter board, while operating transparently, monitors the control, data and address lines to and from the CPU. In particular, write operations to protected memory areas containing critical programming or data, are monitored. If any of the critical portions of the computer control software designated for protection by the trusted operator are attempted to be altered, the multiprocessor logic controller captures control of the CPU, an alarm goes off and the system shuts down. If the error condition keeps recurring, the system may only be restarted by the trusted operator. In such manner, an intrusion representing a possible breach of computer security is prevented before the breach occurs.

UNIPROCESSOR IMPLEMENTATION OF THE PRESENT COPROCESSOR ARCHITECTURE

The division of functions between the CPU, multiprocessor logic controller and the RISC coprocessor is very flexible. In theory, some functions of the multiprocessor logic controller can be incorporated into the RISC coprocessor software. However, the physical interception of control signals to the CPU is naturally embodied in hardware. In addition, because of the speed needed to respond to the appearance of a forbidden address on the address bus, or to capture control on power up, a hardware implementation of the multiprocessor logic controller is preferred.

Also, since the CPU and RISC coprocessor alternate their operation under the control of the multiprocessor logic controller, (wherein one stops when the other starts), the CPU may perform both functions and the RISC coprocessor be eliminated. In such case, the multiprocessor logic controller switches control of the CPU from its normal environment in the PC, to a protected environment on the daughter board. In the protected environment on the daughter board, the CPU may perform the security functions of the RISC coprocessor. However, the main advantage of using one processor switched between normal PC and security functions is in the economy of having only one processor. The tradeoff for eliminating the RISC coprocessor is reduced security, which, in certain commercial applications is acceptable. For higher security, a separate and independent coprocessor is used.

GENERAL COPROCESSOR ARCHITECTURE

In accordance with yet another aspect of the present invention, the RISC coprocessor may be utilized as a general purpose coprocessor. Communication is effectuated through the data and address lines which are monitored by the multiprocessor logic controller. Certain combinations of addresses and data form commands to the RISC coprocessor to carry out a particular task. To perform the task, the multiprocessor control logic captures control of the PC and transfers control to the RISC coprocessor which carries out the requested task. When the task is done, the RISC coprocessor stores the task results in memory space available to the CPU and through the multiprocessor logic controller, returns control of the PC to the CPU. In alternative embodiments, the RISC coprocessor may capture the address and data lines to load task results in RAM memory or on hard disk storage or may leave the result in one of the CPU's general registers.

The RISC coprocessor and the CPU have both separate and shared memory address spaces. Shared memory space is used for inter-processor communication, as indicated above. Separate private memory space in the RISC coprocessor assures that the CPU cannot tamper with the security procedures carried out by the RISC coprocessor. The use of separate memory address spaces for the CPU and RISC coprocessor with the ability of the RISC coprocessor to intercept the control lines of the CPU provides the high level of confidence in the security of the present coprocessor arrangement.

By use of the present invention, the computer system can be set up by the trusted operator such that the CPU does not run any firmware or software (including the mother board BIOS) unless the software is first verified by the RISC coprocessor. To solve the prior art problem of where to start to verify (where to begin), the multiprocessor logic controller, in accordance with the present invention, begins by capturing control of the CPU, so that no untrusted software has an opportunity to run. Then, as the system software is verified by the RISC coprocessor in stages, the CPU is permitted to run more and more of the verified system software, also in stages. As compared to the prior art, system software is verified at every level even before the absolute starting point of running BIOS, that nothing has changed since the trusted operator indicated a trusted condition.

DESCRIPTION OF THE FIGURES

FIG. 10 is a diagram of the choices provided by the Trusted Operator interface program.

DETAILED DESCRIPTION

Overview

Figure 1:
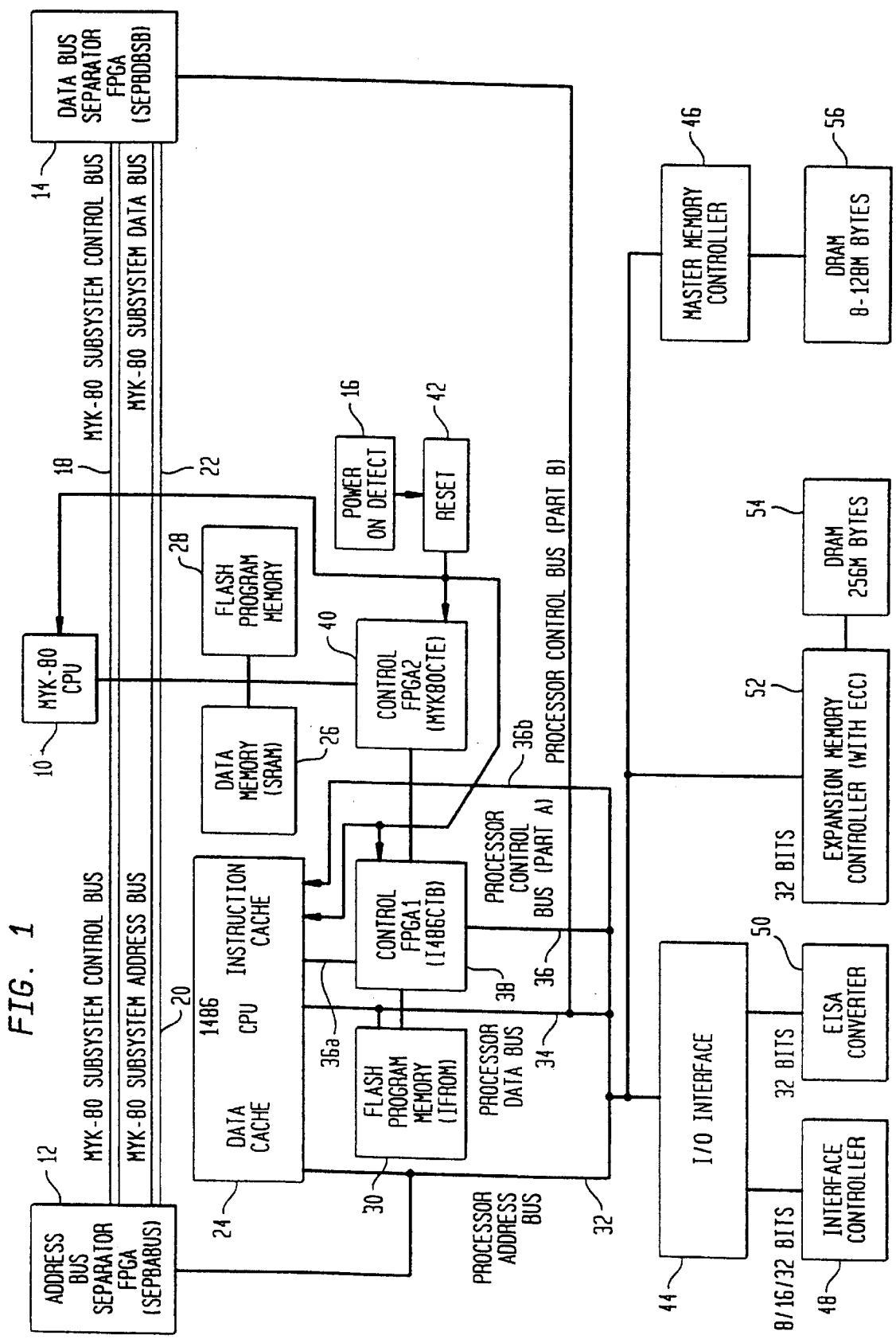
FIG. 1 is a block diagram of a security enhanced processor board in accordance with the present invention.

A block diagram of a computer with a security coprocessor to form a Security Enhanced Processor Board (SEPB), in accordance with the present invention is shown in FIG. 1.

The SEPB consists of a dual microprocessor arrangement of an Intel I486 CPU 24 and a RISC coprocessor MYK-80, 10, programmed as a security coprocessor. The MYK-80 is a special purpose combination of an ARM6 RISC microprocessor, some amount of ROM to store the firmware that composes the routines, and other logic as needed to support the MYK-80 and external operations. The MYK-80 was designed by, Mykotronix, Inc. and is processed by VLSI Technologies, Inc. Mykotronix, Inc. is responsible for the technical support of the MYK-80 and for its documentation.

Along with the two microprocessors 10, 24 are two sets of ROMs, MFROM 28 and IFROM 30, organized into 32-bit wide memories and holding specialized programs and data for the MYK-80 and the Intel 80486 microprocessor, respectively, and a Shared 32-bit wide RAM, SRAM 26. There are two FPGA's, control FPGA2 40 (MYK80CT2) and control FPGA1 38 (I486CTE), on the SEPB that provide logic for controlling the Host PC operation in general and operations of the MYK-80 and the I486 microprocessors. There are two additional FPGA's, Address Bus Separator FPGA 12 (SEPBABUS) and Data Bus Separator FPGA 14 (SEPBDBSB) that provide the logic for controlling all communications between the MYK-80, the I486 and the PC electronics via the Processor Address Bus 32 and the Processor Data Bus 34, respectively. FPGA's 12 and 14 permit the MYK-80, via subsystem Control Bus 18, to keep the MYK-80 Subsystem Address Bus 20 and MYK-80 Subsystem Data Bus 22 separate from the I486 Processor Address Bus 32 and the I486 Processor Data Bus 34, respectively.

When designed as an add on board to an existing Host PC, the SEPB has a connector on it that is the same as the 168-pin Pin Grid (PGA) connector of the I486 CPU in the Host PC so that the SEPB can be plugged into the Host PC in the same socket that would hold the I486 CPU. The I486 CPU is then plugged into a socket provided for it on the SEPB.

Note that Processor Address Bus 32 and Processor Data Bus 34 are continuously connected to the I486 CPU, and selectively connect to the MYK-80, via FPGA's 12 and 14 to transfer addresses over the Processor Address Bus 32 and to send and receive data over the Processor Data Bus 34. However, part of the Processor Control Bus 36 normally directly connected to the I486 CPU 24 is separated by FPGA 38 from the I486 CPU 24 under the control of the multi-processor logic controller built into FPGA1 38 and FPGA2 40. In such manner, the multi-processor logic controller acting as a coprocessor to CPU 24, is able to capture CPU 24 by intercepting the CPU 24 Processor Control Bus (Part A) 36 signals and substituting other Processor Control Bus (Part A) 36A signals at the output of FPGA 38 (for control signals to the CPU, and vice versa for control signals from the CPU). The remaining Processor Control Bus (Part B) signals 36B are directly connected to the I486 CPU 24. The multiprocessor logic controller allows the I486 to run special code which can then request the MYK-80 processor 10 to preform a task (usually a security related task). Power on circuit 16 and reset signals 42 are coupled to FPGA's 38 and 40.

Figure 8:
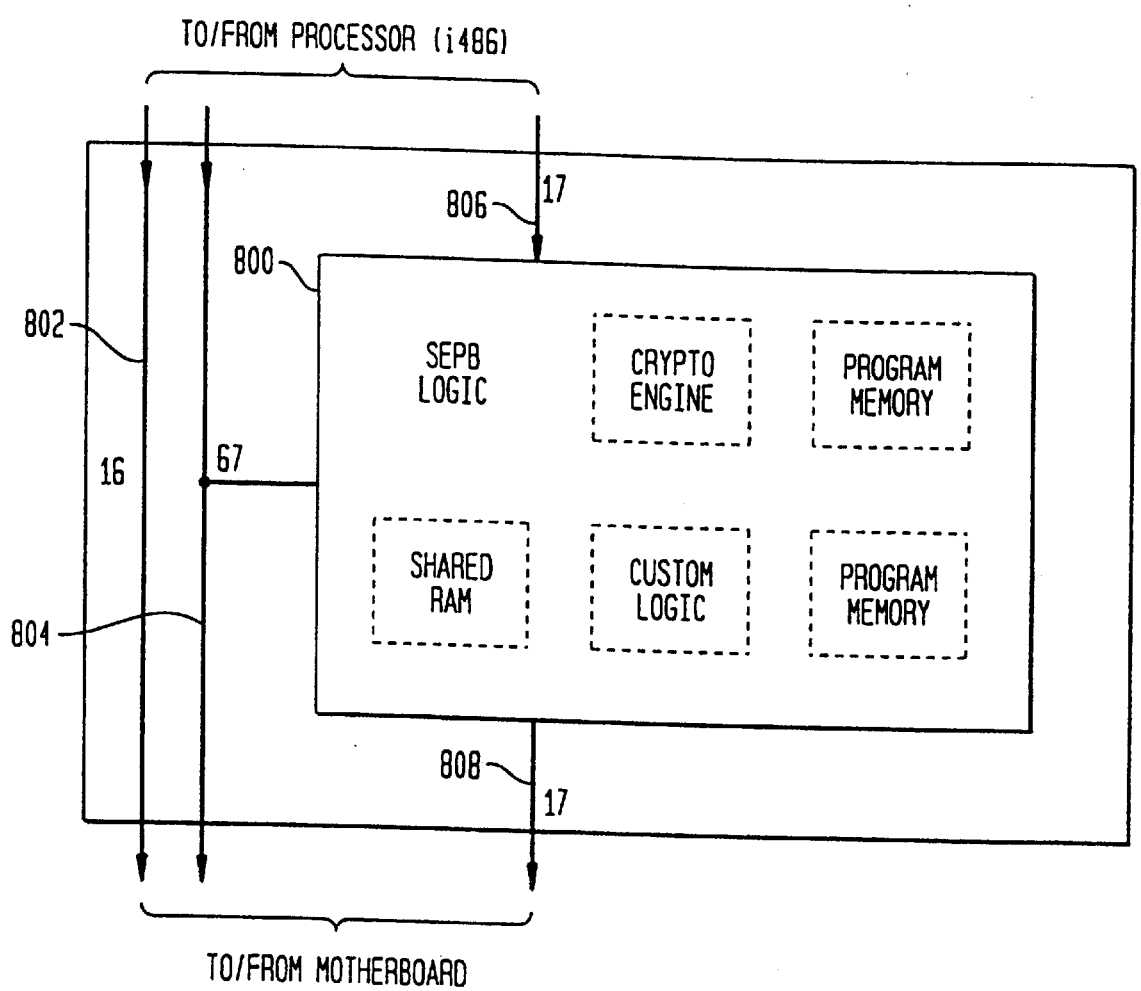
FIG. 8 is a block diagram of a Security Enhanced Processor Board in accordance with the present invention.
Figure 9:
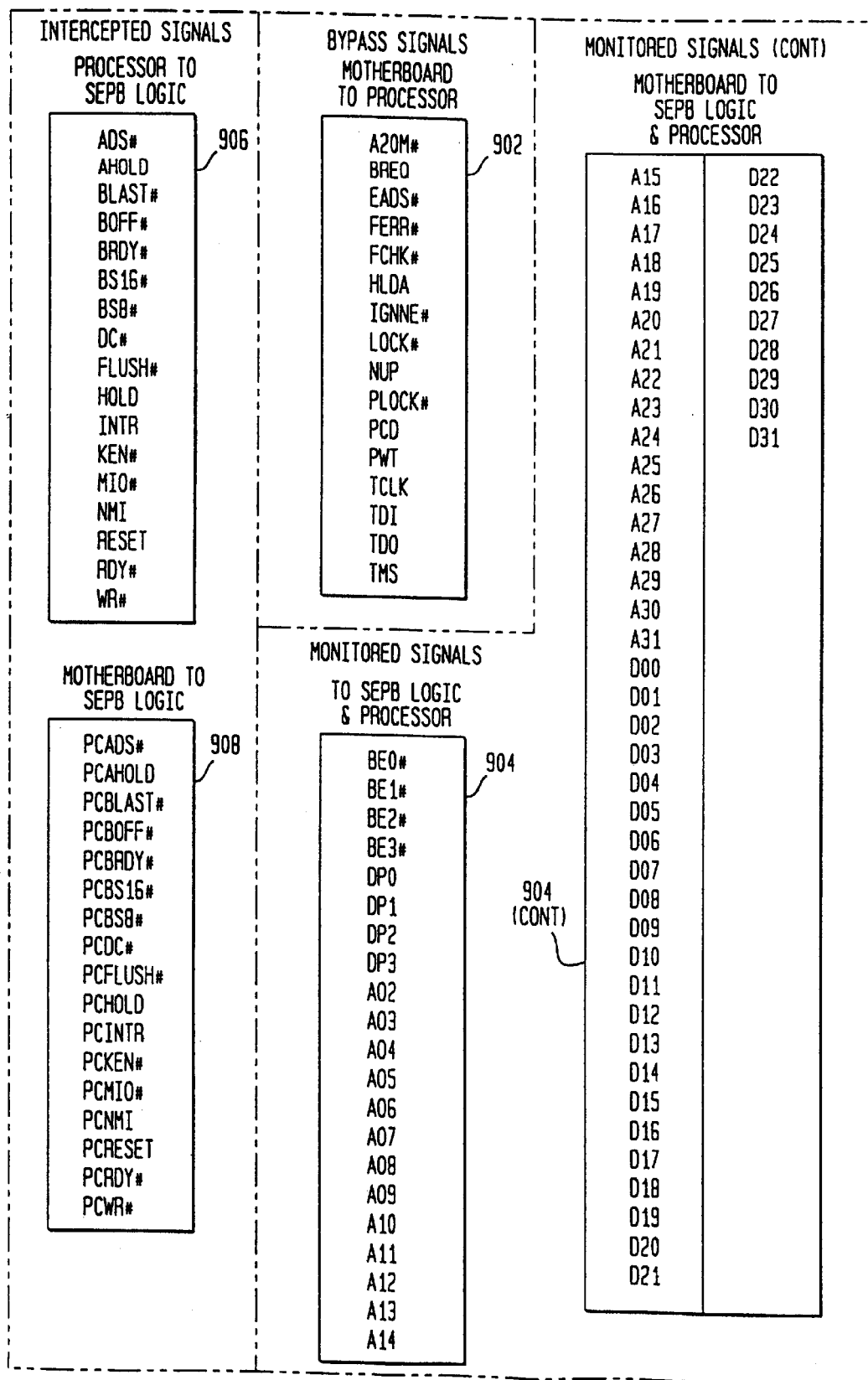
FIG. 9 is a table listing of the signals intercepted, bypassed and monitored by the Security Enhanced Processor Board in accordance with the present invention.

A more detailed block diagram of the signals effected by the SEPB logic is shown in FIGS. 8 and 9. In FIG. 8, the SEPB logic 800 intercepts 17 signals to/from 808 the mother board, which are going to/from 806 the processor. The 17 intercepted signals are listed in FIG. 9 tables 904 and 906 respectively on each side of the interception. Sixty seven signals in FIG. 8 are monitored 804 by the SEPB logic. These 67 monitored signals are listed in FIG. 9, table 904. Sixteen signals in FIG. 8 are bypassed 802 by the SEPB logic. These 16 bypassed signals are listed in FIG. 9, table 902.

The portion of FIG. 1 constituting the conventional Host PC System (in conjunction with the I486 CPU 24) includes I/O interface 44, interface controller 48, EISA converter 50, expansion memory controller 52 with associated DRAM memory 54, as well as a master memory controller 46 and DRAM memory 56. Coprocessor 10, SRAM memory 26, FROM memory 28, FPGA's 12, 14, 38, 40, and FROM 30 comprise the elements added to the Host PC system to form a Security Enhanced Processor Board. In situations where an insecure Host PC is being upgraded, the latter elements are added via a plug in daughter board. However, the latter elements may be added onto a conventional mother board, or integrated, fully or partially, into a special purpose I486 CPU.

Figure 4:
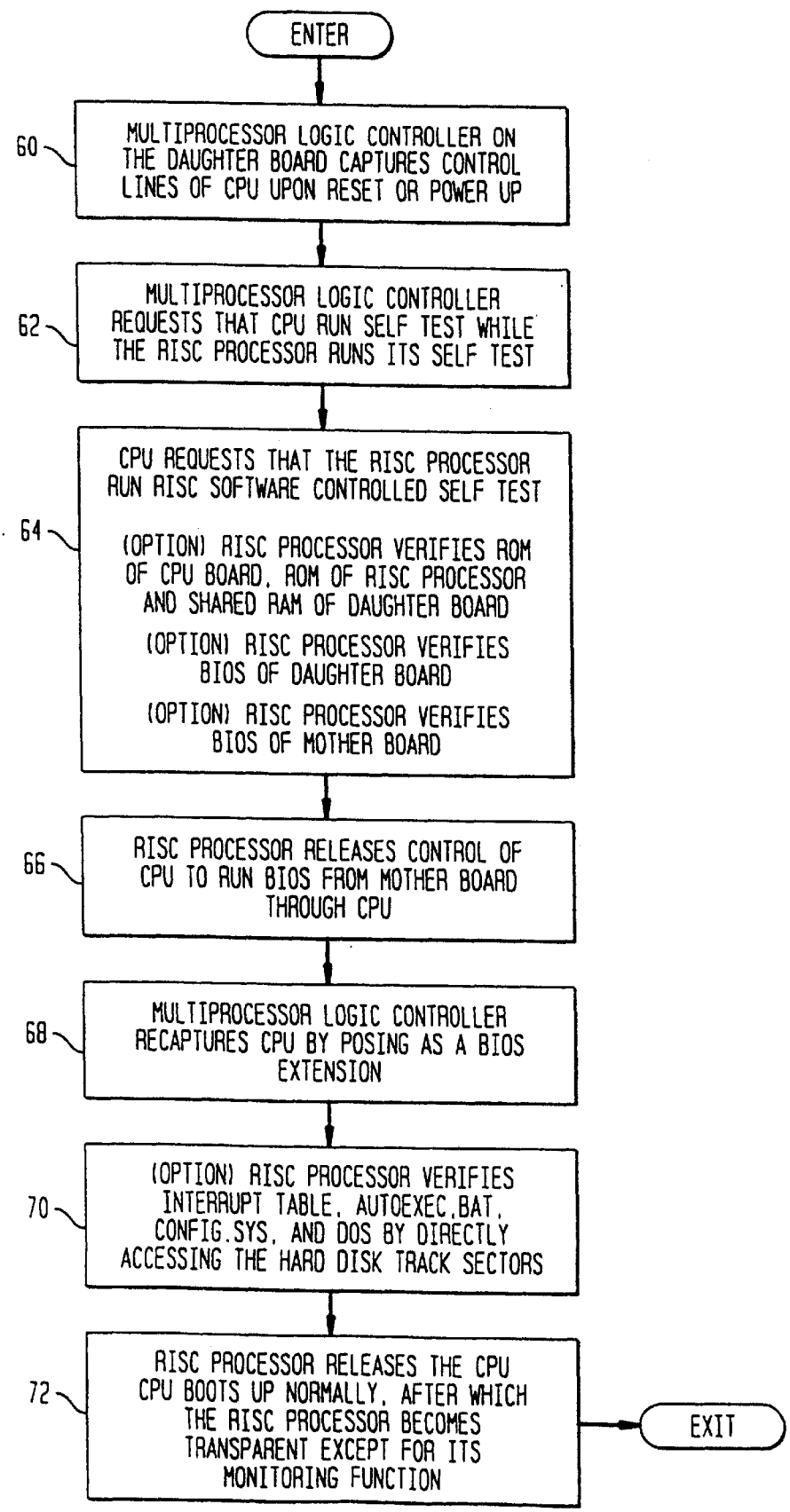
FIG. 4 is a flow chart diagram of the intrusion detection operation of a multiple processor system in accordance with the present invention.

Intrusion Detection (FIG. 4)

A flow chart illustrating the use of the coprocessor of the present invention for intrusion detection is shown in FIG. 4. The intrusion detection function is entered upon reset or power up at step 60, where the multiprocessor logic controller on the daughter board captures the control signal lines of the CPU.

First, at step 62, the multiprocessor logic controller requests that the CPU run its self test and that, simultaneously, the RISC processor run its self test, and any other tests programmed into the RISC SEPB firmware, such as those of memories and SEPB hardware. When the running of these tests is completed, the operation of the RISC processor is halted while the CPU operation is continued with the execution of the CPU SEPB firmware.

When the controller runs the first part of the CPU firmware it results in the passing of a request to the RISC processor, via the SRAM, for it to run its software directed self test. Once the request is posted in the SRAM the CPU performs an operation that halts its execution of its firmware and starts the operation of the RISC processor to let it execute its firmware which fetches the request message posted in the SRAM by the CPU and then, after interpreting the request, runs its self test as requested. After the RISC processor completes running its software directed self test the RISC performs an operation that halts its execution of its firmware and resumes the execution of the CPU firmware.

At this point, if, at the prior option of the trusted operator, requests for the SEPB to perform one or more digital signature verification tests have been stored in the CPU SEPB FROM, the CPU firmware will post one message at a time into the SRAM to request that the desired digital signature verification test be performed. As before, once the request is posted in the SRAM, the CPU performs an operation that halts its execution of its firmware and starts the operation of the RISC processor to let it execute its firmware which fetches the request message posted in the SRAM by the CPU and then, after interpreting the request, runs the digital signature verification test as requested. After the RISC processor completes running the requested verification the RISC performs an operation that halts its execution of its firmware and resumes the execution of the CPU firmware.

The CPU will post a request for a digital signature verification test to be performed by the RISC processor for each such test stored in the first of its three test request tables stored in its FROM. For each such test request the operations performed by the SEPB's components are the same as that just described.

After all tests listed in this first test request table are performed, the CPU then makes a transition from executing the SEPB firmware to executing the BIOS firmware of the PC. The SEPB logic insures that this transition is made in a manner that is identical to the transition that would be made in a PC that did not have an SEPB installed, whether the PC is built to perform its CPU self test or not.

Typically, in a PC that has an SEPB installed, the trusted operator will set the system up such that the SEPB will perform digital signature verification tests on the contents of the BIOS ROM (or FROM or EEROM) on the CPU mother board, the ROM(s) on the daughter board, and on any BIOS extension device installed into the PC at step 64.

After each self test and digital signature test is performed, the RISC coprocessor posts a reply message in the SRAM indicating the results of the test. If the tested component passes the verification test the CPU will be told that it can continue on in its operating sequence and run another test. After all tests listed in the first test table are passed the CPU can perform the transition operation allowing the CPU to begin execution of the system BIOS. If any one of the tests is failed the result message posted into the SRAM by the RISC processor will be interpreted by the CPU SEPB firmware as a command to sound the failure audible alarm signal and then to shut the system down and await the next hard reset signal before starting its operation over again.

It is noted that, after the SEPB logic and the CPU SEPB firmware cause the CPU to make the transition of its operation to one of executing the system BIOS the SEPB is totally transparent to the PC, that is, not affecting the PC operation in any way and being unseen by the PC. During this, and other periods of time when the SEPB is transparent to the PC operation only the SEPB BIOS extension code is visible to any program being executed on the PC. Peripheral controllers installed into the PC cannot detect the SEPB using normal connections available to such devices thereby preventing any remote device from causing any operation of any device in the PC to detect the presence of the SEPB in the PC. The SEPB, on the other hand will continue to monitor the CPU signals to which it is connected to determine if it should respond to the normal PC operation of reading the SEPB BIOS extension code or of executing this BIOS extension code. The SEPB will also continue to monitor these signals to determine if it should respond to the occurrence of an event that it should report and/or prevent as a breach of security.

After the CPU executes its BIOS firmware to set up the PC it completes the system setup by searching for and executing BIOS extension firmware for the peripheral controllers installed in the PC. The SEPB multiprocessor logic controller recaptures the CPU by posing as one of these peripheral controllers and causes the execution of its BIOS extension firmware at step 68. While the PC executes the SEPB BIOS extension firmware a step is executed that causes control of the CPU to be passed back to the SEPB at step 70. At this point the SEPB will search its second test table to determine if there are any digital signature verification tests (previously selected at the option of the trusted operator) which it should request that the RISC processor should perform. Such verification tests to be performed at this time would be tests on the contents of the PC boot sector interrupt table, the autoexec.bat file, the config.sys file, and other operation critical files by directly accessing the PC RAM and the hard disk track sectors in the Host. To request that the RISC processor perform the test the CPU posts a request message into the SRAM as before and then halts its SEPB firmware execution and starts the RISC processor execution of its SEPB firmware as before. The RISC processor performs the requested test as before and then halts its operation and restarts the CPU operation as before.

Note that when the SEPB is performing its functions the CPU, the I486, and its RISC, the MYK-80, alternate operation under control of the FPGA implemented multiprocessor logic controller. That is, when one processor starts operating, the other halts, and vice versa.

Having passed all the tests requested by the contents of the second SEPB test table, the SEPB returns the CPU connections to the state that allows the PC to operate normally. (As before, if any of these tests are failed the PC is shut down to await a hard reset to initiate the system operation from the beginning as before.)

At this point the PC's operating system is allowed to boot up normally at step 72. When the I486 CPU is turned over to the PC for the boot operation the SEPE again becomes transparent except for its monitoring.

The diagram of FIG. 4 illustrates this back and forth control by the position of the process step in the flow chart. In the center, are multiprocessor logic controller operations 60, 62 and 68. On the left, are CPU steps 66 and 72, while on the right are RISC coprocessor steps 64 and 70. In the present arrangement, a hardwired signal from the I486 CPU deactivates the I486 CPU and commands that the MYK-80 become active. Likewise, another hardwired signal from the MYK-80 processor deactivates the MYK-80 processor and commands that the I486 CPU become-active.

The present architecture may be implemented in multiple processor systems if the processors operate in a master slave arrangement. In this case the present design applied to the master unit should suffice. If the processors work in a heterogeneous multi-tasking arrangement then a dual of the present SEPB is needed to provide a trusted computing base for each such processor units.

Figure 5:
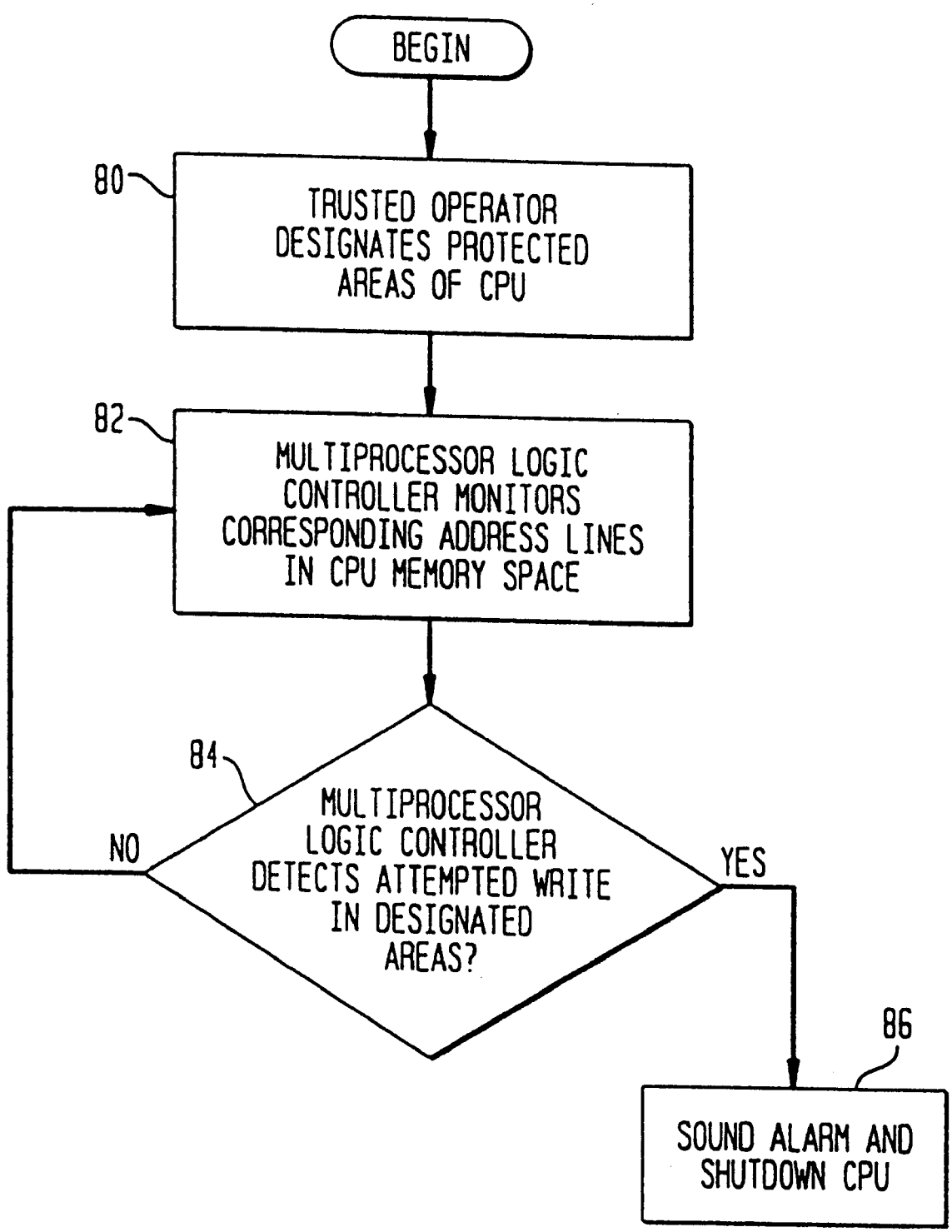
FIG. 5 is a flow chart diagram of the intrusion prevention operation of a multiple processor system in accordance with the present invention.

Intrusion Monitoring (FIG. 5)

In operation, the multiprocessor logic controller and MYK-80 coprocessor is transparent. However, while transparent, the multiprocessor logic controller performs a monitoring function. FIG. 5 illustrates the intrusion monitoring function beginning at step 80 where the trusted operator (TO) designates areas of the Host PC that are to be protected from tampering. The multiprocessor control logic, via its access to address, data and control buses 32, 34 and 36, monitors address lines in the CPU memory space at step 82 and determines at step 84 when prohibited access, such as writing data into protected areas of memory, is attempted. When an intrusion attempt is detected at step 84, the SEPB will sound an alarm and shut down the system at step 86. Shutdown is a normal operation of the I486 CPU which is caused by the execution of the specified instruction. For those processors that do not have such a command shutdown can be caused by the multiprocessor logic controller of the SEPB.

Exerting Control Over (Deactivating) The I486

There are alternate ways of halting SEPB operation of the I486 to allow the RISC processor to execute the proper portion of its SEPB firmware. The preferred embodiment is to intercede in a memory bus cycle. The CPU begins a bus cycle by having bus access, placing an address on the address bus lines and sending out the ADS# signal. The I486 then awaits the return of the "ready" signal that signifies the conclusion of the bus cycle. The "ready" signal is sent to the CPU by the addressed PC unit to indicate either that the data the CPU has requested is ready for it to accept or that the data sent by the CPU has been accepted by the addressed unit. If the "ready" signal is not received by the CPU it will wait forever for it. For the SEPB to stop the CPU, the SEPB firmware being executed by the CPU contains a "write data" operation to send data to the multiprocessor logic controller. To stop the CPU's execution of its SEPB firmware at this point the multiprocessor logic controller simply does not return the "ready" signal to the CPU. Instead the logic controller starts the RISC processor's execution of its SEPB firmware by restarting the generation of the RISC clock and causing the I486 to release bus and control signals.

In this manner the goal of having either the CPU executing its SEPB firmware or the RISC processor executing is firmware, but not both simultaneously, during periods of SEPB operation is achieved. When the multiprocessor logic controller knows that the CPU is waiting for a "ready" signal but it wants the RISC processor to execute its SEPB firmware the multiprocessor logic controller will generate, and send to the CPU, a "hold" signal to get the CPU to release control of both the Processor Address Bus and the Processor Data Bus by the CPU putting its bus driver circuits into the High impedance state. Then, with the Processor Address Bus and the Processor Data Bus free the RISC processor can use them whenever it wants to transfer data between it and other parts of the SEPB or PC.

Later, when the execution of the RISC processor SEPB firmware reaches a point where it is to be stopped and the execution of the CPU SEPB firmware is to be restarted, the RISC processor performs a similar "write data" operation to send a signal to the multiprocessor logic controller to perform the operations necessary to make the switch. When the multiprocessor logic controller detects this special "write data" operation it stops the operation of the RISC processor and releases the CPU to allow it to continue its execution of its SEPB firmware by simply stopping the generation of the clock signal for the RISC processor, stopping the generation of the "hold" signal and ceasing sending it to the CPU, and generating a "ready" signal and sending it to the CPU.

An alternate implementation to control a CPU, is to stop the clock of the CPU as it does the RISC processor clock. However, this approach is somewhat limited because it cannot be used with CPU's which have an on-chip phased locked loop to increase its internal clock speed. Such phased locked loops, used for clock rate multiplication, continue to run for a while after the external clock has been stopped and take a non zero amount of time to reach its full operation state after the external clock has been started.

Yet another alternate embodiment to exert control over a CPU is to halt the CPU as is done in a multiple processor master slave arrangement where the master CPU halts the slave CPU. The CPU may be also be controlled by intercepting one interrupt signal and substituting another, or substituting a different interrupt vector, or a interrupt address for the control signal. Other ways to control a CPU include intercepting a write strobe signal, intercepting a read strobe signal or, as described above, by intercepting a data ready signal.

As used herein, a write strobe is any one of the type of control signal in which a CPU indicates that the information output to a bus (data or address) is to be written elsewhere. An example is the address strobe signal, ADS#, which is the start signal for the processor bus. A read strobe is any one of the type of control signal in which a CPU indicates that the information input from a bus (data or address) is to be read. A data ready signal is any one of the type of control signal to indicate that information (data or address) has been placed on or read from a data or address bus.

Yet other ways to assert control over the CPU is to intercept address and/or data lines. For example, intercepting data lines permits the substitution of different executable code than would be normally provided to the CPU from the addressed memory space. Intercepting address lines would force the CPU to alternative memory space for executable program or data.

Implementation of the Multiprocessor Logic Control in FPGA's Data Bus Separator FPGA 14 (SEPBDBSB)

The data bus separator logic designed into this FPGA provides the connections for the bidirectional transfer of data. The SEPB I486 Subsystem uses this unit to complete transfers in both directions with the Shared RAM 26. The MYK-80 uses this unit to read the information stored in the SEPB I486 Subsystem's Flash ROM 30 and in the PC's RAMs and ROMS.

All of the data transfers involving components of the SEPB I486 Subsystem passed through the SEPBDBUS control logic and the data bus output tristate drivers. Data to be transferred from the PC memory subsystems to the MYK-80 is latched in the SEPBDBUS when the PC memory subsystem activates the first RDY# signal or the BRDY# after the ADS# signal becomes active. The outputs of the latches are then later sampled by the MYK-80.

FPGA 14 also contains logic to control the selection of which ADS# or BRDY# signal to use to latch the information supplied by the PC memory subsystem. This same logic is part of the circuitry that generates the ADS#, the BOFF# and the BLAST# signals used to convert an MYK-80 memory read operation into an I486 memory read bus cycle.

Bus Separator FPGA 12 (SEPBABUS)

The address bus separator logic is also implemented on an FPGA. For the most part it consists of 30 bi-directional tristate drivers. The addresses are passed in one direction when they are supplied by the I486 to address the SEBP's Shared RAM and in the other direction when they are supplied by the MYK-80 to address the PC's memories or the SEPB I486 Subsystem's Flash.

The exception to this bi-direction switch logic is included to accommodate the differences in the ways the I486 and the MYK-80 handle the two least significant bits of the address. The I486, instead of using encoded address bits for byte and word addressing replaces these with four signals, BE0# through BE3#. With proper encoding and sequencing of these signals the I486 can properly execute byte, word and doubleword transfers even if one of the latter two operations addresses an item that is stored in memory over a doubleword boundary.

The MYK-80 uses only the encoded version of these two least significant address bits and augments them with another signal that defines whether the I/O operation is a byte or a (double)word. This signal, NBWL, is active low to define byte transfers and high for doubleword transfers. The only way to know that the MYK-80's ARM6 is performing a sixteen bit transfer is that the NBWL signal is high and the two least significant address bits have a value of 10b. (The other two values, 01b and 11b, cannot occur in the ARM6 when the NEWL signal is high.)

The SEPBABUS logic implements these simple rules to generate the appropriate BE0# through BE3# signals for transmission to the SEPB I486 Subsystem and to the PC's memory subsystems for the subset of I486 data transfer operations needed for proper SEPB MYK-80 Subsystem operation.

Control FPGA's 38, 40

Figure 2A:
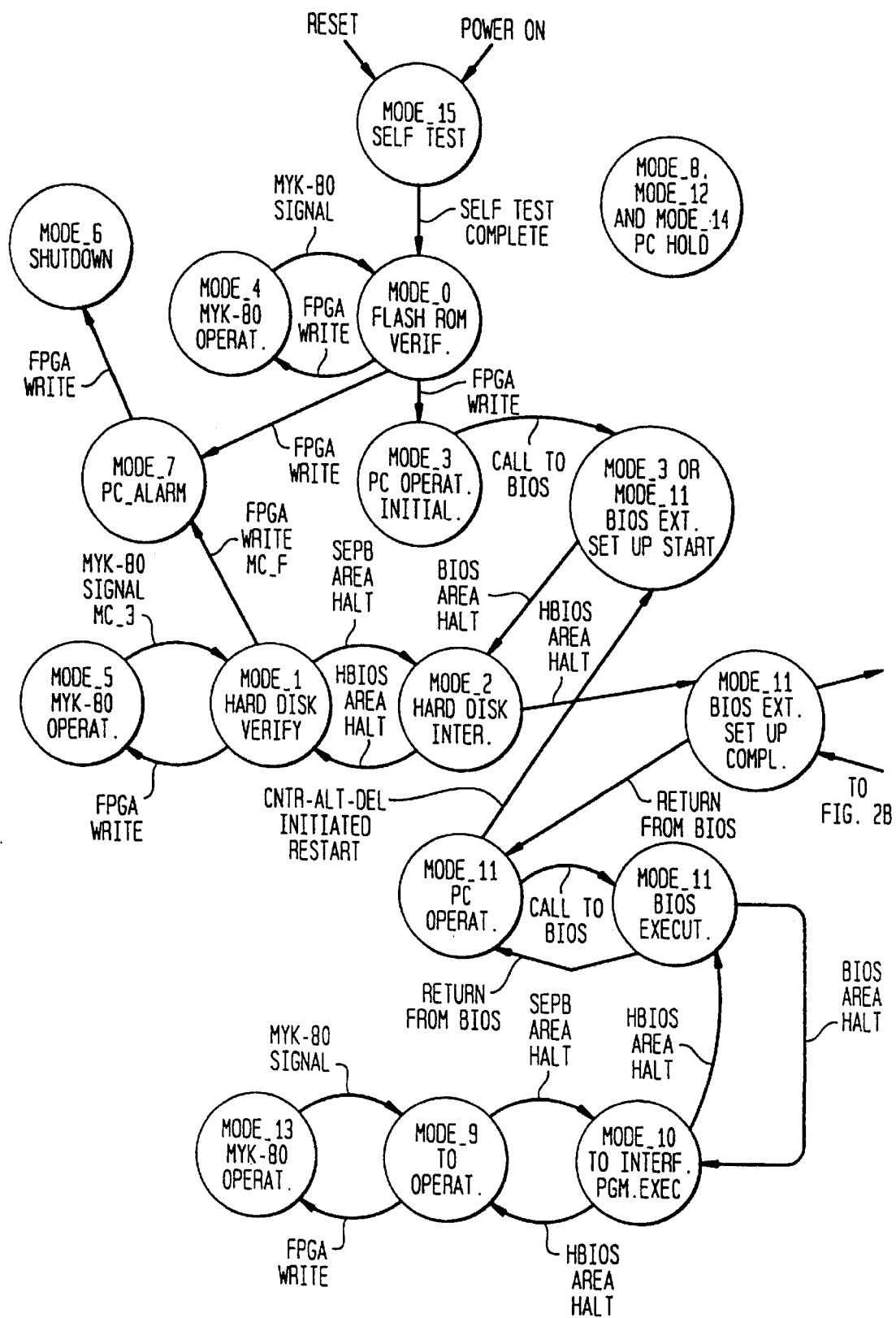
FIGS. 2A and 2B is a state diagram of a logic controller for controlling an I486 CPU operation in accordance with the present invention.
Figure 2B:
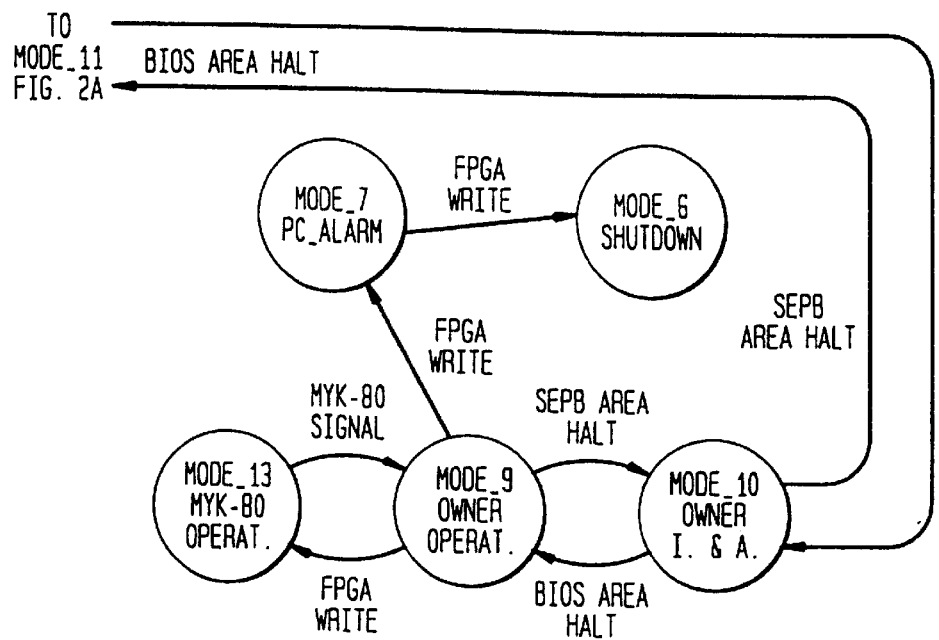
Figure 3:
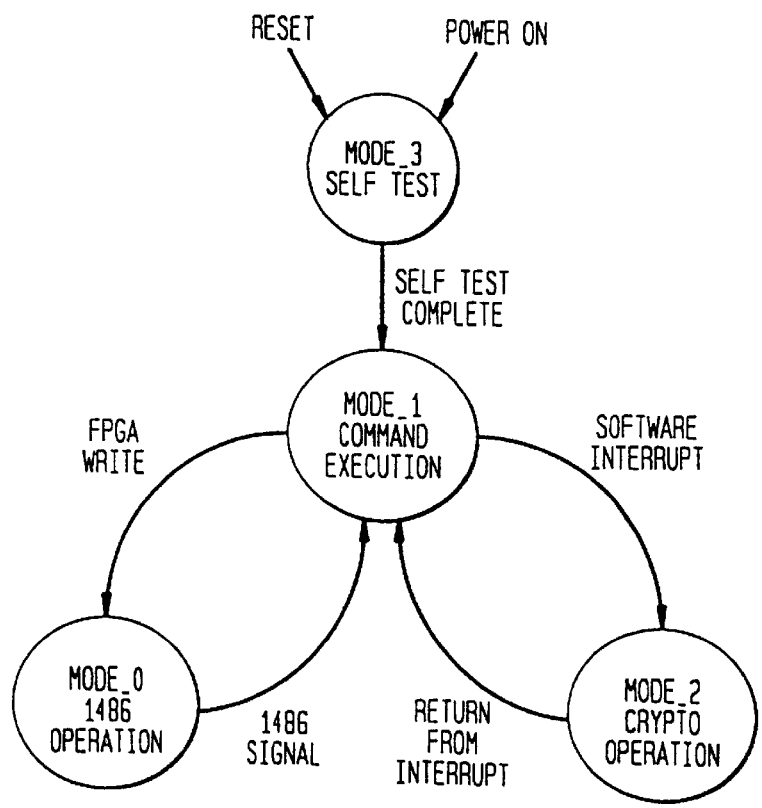
FIG. 3 is a state diagram of a logic controller for controlling a RISC coprocessor operation in accordance with the present invention.

The operation of the SEPB multiprocessor logic controller (a finite state machine) is summarized in the state diagrams of FIGS. 2A, 2B and 3. The SEPB firmware is made up of parcels of code with one parcel of code for each Mode of the state diagrams of FIGS. 2A, 2B and 3. Each parcel consists of one or more sections with each section having one entry point and one exit point. There are parcels of code for each of the following Modes, where Modes indicated by (I) refer to I486 modes in FIG. 2, and Modes indicated by (M) refer to MYK-80 modes in FIG. 3.

Mode Definition a. mode #0(I)

This code is entered from the Power On, Mode #15(I), code. It directs the MYK-80 to perform its Software Directed Self Test and then directs the SEPB in performing all of the tests defined by the contents of the I486's A Table. For each operation that the I486 commands the MYK-80 subsystem to perform it makes a transition from Mode #0(I) to Mode #4(I) where it halts its operation until the command given is performed by the MYK-80. After the commanded operation is completed it transitions back to Mode #0(I). In making the transition from Mode #0(I) to Mode #4(I) the I486 code executes a memory write instruction with the appropriate FPGA address to cause the mode switch. When the "Memory Write" bus cycle is started by the I486 the FPGA recognizes the address and does not send the bus cycle complete RDY# signal to the I486. As a result the I486 idles in its program execution and the FPGA sends the HOLD signal to the I486 to get it to free all buses and bus related control signals for the MYK-80 subsystem to use. When the MYK-80 subsystem sends a "Command Completion" signal to the I486 Controller FPGA the FPGA restarts the I486 program execution by sending the RDY# signal to the I486 and releasing the HOLD signal. Neither this parcel of the SEPE's I486 code nor the supporting MYK-80 code is visible to the Host PC. Neither of these code parcels can, therefore, be read by any Host PC resident memory contents examination program. These code parcels are also stored in the SEPB I486's Flash ROM and in the SEPB MYK-80's Flash ROM respectively so they cannot be altered by any Host PC based program.

If an error is detected during any one of the MYK-80 Command Execution Cycles the I486 will make a jump to the code for Mode A #7(I). The jump to Mode #7(I) code is accompanied by another write to an FPGA address which causes the I486 Controller to change the Mode of its Control State Machine.

If no error is found the I486 code will make a transition to the execution of the PC's System Initialization code. This transition is required to appear as if the I486 has just completed its RESET and BIST operations and is fetching its first instruction. To achieve this change the Mode #0(I) code executes a Memory Write instruction to a third FPGA address with this instruction being located in the I486's SEPB Flash ROM at an address corresponding to the instruction location just before 0xFFFFFFF0. As a result the I486 Controller will change the Mode of its Control State Machine to Mode #3(I) and the next instruction fetched by the I486 will be the first instruction of its System Initialization Firmware.

b. Mode #1(I)

While operating in Mode #1(I) the I486 checks the "B" table for entries of areas to test. If there is an entry, then the I486 executes a memory write instruction with the appropriate FPGA address to cause the mode to switch to Mode #5(I) (MYK-80 runs). For each operation that the I486 commands the MYK-80 subsystem to perform it sets up the command message for the MYK-80 Subsystem in the SEPB's SRAM 26 and then makes a transition from Mode #1(I) to Mode #5(I). When the "Memory Write" bus cycle is started by the I486 the FPGA recognizes the address and does not send the bus cycle complete RDY# signal to the I486. As a result the I486 idles in its program execution and the FPGA sends the HOLD signal to the I486 to get it to free all buses and bus related control signals for the MYK-80 subsystem to use. When the MYK-80 sends a "Command Completion" signal to the I486 Controller FPGA the FPGA restarts the I486 program execution by sending the RDY# signal to the I486 and releasing the HOLD signal.

If an error is detected during any one of the MYK-80 Command Execution Cycles the I486 will make a jump to the code for Mode #7(I). The jump to Mode #7(I) code is accompanied by another write to an FPGA address which causes the I486 Controller to change the Mode of its Control State Machine to Mode #6(I). If no error is found, the I486 checks the "B" table for additional tests to be run. If there are more tests, the I486 repeats the above proceedure to check them.

When there are no more entries in the "B" table, the I486 code will make a transition to the execution of an additional portion of the SEPB's Mode #2(I) code. This transition, from Mode #1(I) to Mode #2(I), is made by the I486 executing the appropriate HALT Instruction. When the HALT Instruction is executed the I486 puts the signals out that alerts all units connected to the bus that the is HALT Instruction has been executed by sending out the Special BUS Cycle control signals. When the multiprocessor logic controller recognizes that the I486 has executed the HALT Instruction and has sent out the Special Bus Cycle control signals signalling the Halt operation it generates a Non-Maskable Interrupt, NMI, signal and sends it to the I486. In response to the receipt of the NMI signal the I486 fetches the Interrupt Response Destination Address to determine where to get the next instruction to execute and to make an operating mode switch to Mode #2(I). The Flash ROM address used to fetch the proper Interrupt Response Destination Address is generated according to the logic described in Table C-1 and Table C-2. (It should be noted that this parcel of the SEPB's code is not visible to the PC and cannot be read by any PC resident memory contents examination program. This code is also not visible to the PC and is stored in the SEPB I486's Flash ROM so it cannot be altered by any PC non-SEPB operation.)

c. Mode #2(I)

The initial part of the SEPB BIOS Execution code is ended by the execution of a Halt Instruction. The Halt Bus Cycle is recognized by the I486 FPGA Controller logic and it automatically generates a Non-Maskable Interrupt, NMI, signal and sends it to the I486. The I486 then performs an Interrupt Response Bus Cycle and reads the address of the first instruction of the Interrupt Response Code. In performing the Interrupt Response Bus Cycle the I486 does a Memory Read operation using the address 0x00000008. The SEPB I486 Controller recognizes the operation and redirects the memory read so that the data read by the I486 comes from the appropriate SEPB I486 Flash ROM. As this address is read by the I486 the I486 Controller will change the mode of its Control State Machine to Mode #2(I) and the next instruction fetched by the I486 will be the first instruction of the second parcel of its BIOS firmware. Neither this parcel of the SEPB's I486 code nor the supporting MYK-80 code is visible to the PC. Neither of these code parcels can, therefore, be read by any Host PC resident memory contents examination program. These code parcels are also not visible to the Host PC because they are also stored in the SEPB's Flash ROM and in the SEPB MYK-80's Flash ROM respectively. Therefore, they cannot be altered by any PC non-SEPB operation.

This code is entered from the initial segment of the Mode #3(I) BIOS Extension code. Mode #2(I) is a bridge from/to Mode #3(I) and Mode #1(I). It is used to allow the SEPB to access the hard drive. If a table entry requires a disk access, the SEPB goes from Mode #1(I) to Mode #2(I), reads the drive and then goes back to Mode #1(I) (and to Mode #5(I)) to check data.

After the SEPB completes performing all of the tests defined by the contents of the I486's B Table it executes another HALT Instruction. In response to the execution of the HALT instruction, and the subsequent generation of the NMI signal by the multiprocessor logic controller, I486 fetches the Interrupt Response Destination Address to determine where to get the next instruction to execute and to make an operating mode switch to Mode #11(I). The Flash ROM address used to fetch the proper Interrupt Response Destination Address is generated according to the logic described in Table C-1 and Table C-2.

d. Mode #3(I)

For the most part the code executed in Mode #3(I) consists of the PC's System Initialization firmware. At the end of the execution of this firmware, however, the firmware searches the PC's address space from 0xC0000 to 0xE0000 to determine if a BIOS Extension device has been added to the system. If such a device has been added to the PC execution control is given to the BIOS Extension Device's code so that the added subsystem may be initialized.

Normally the Mode #3(I) System Initialization code execution begins with the Instruction fetched from location 0XFFFFFFF0 following the hardware performing a Hard Reset and the appropriate BIST's. Execution of the System Initialization code, or rather a part of it, can begin after an operator enters the soft reset command from the system keyboard by simultaneously depressing the(CNTL), Alternate (ALT) and Delete (DEL) keys. When this CNTL-ALT-DEL command is entered via the keyboard the PC will be operating in Mode #11(I) but will execute the same code it executed while operating in Mode #3(I). Consequently, the I486 Controller views the execution of code within Mode #3(I) and Mode #11(I) for code within the first 0.5 KB of the BIOS Extension Addresses as being the same and permits the SEPB to transition to operation in Mode #2(I)

At the end of its execution cycle the System Initialization code executed in Mode #3(I) or Mode #11(I) examines every 2 KB block of the BIOS Extension address space for such devices and there may be several such devices in any PC. One such device is the SEPB. When execution control is transferred to the SEPB BIOS Extension code the transfer is achieved by the execution of a Subroutine Call. The execution of the initial parcel of the SEPB BIOS Extension code execution is, therefore, accomplished with the SEPB in operating in Mode #3(I). The code found within this first 0.5 KB of the SEPB BIOS Extension address space is that used to put the state of the I486's stack in the proper state and to execute the Halt Instruction to make the operating mode transition to Mode #2(I).

The SEPB's BIOS Extension code is visible to the PC and can be read by any PC resident memory contents examination program, as for example, a program such as the DOS Debug facility. However, since the SEPB's BIOS Extension code is stored in the SEPB I486's Flash ROM it cannot be altered by any PC non-SEPB operation.

e. Mode #4(I)

While in Mode #4(I) the I486 is not executing a program. Rather it is waiting for the Memory Write Operation with the address mapped to the FPGA logic to be completed before going on. It is during this time that the SEPE's MYK-80 Subsystem is executing its code to perform the operation commanded by the I486. This parcel of the SEPB's code is not visible to the PC and cannot be read by any PC resident memory contents examination program. This code is not visible to the PC and since it is stored in the SEPB I486's Flash ROM it cannot be altered by any PC non-SEPB operation.

f. Mode #5(I)

While in Mode #5(I) the I486 is not executing a program. Rather it is waiting for the Memory Write Operation with the address mapped to the FPGA logic to be completed before going on. It is during this time that the SEPB's MYK-80 Subsystem is executing its code to perform the operation commanded by the I486. This parcel of the SEPB's code is not visible to the PC and cannot be read by any DC resident memory contents examination program. This code is not visible to the PC and since it is stored in the SEPB I486's Flash ROM it cannot be altered by any PC non-SEPB operation.

g. Mode #6(I)

While operating in this mode the I486 executes a Shutdown Instruction and stops executing code. After this Shutdown Instruction is executed the only exit from this state is to send the I486, and the remainder of the PC and the SEPB a hard Reset signal. This parcel of the SEPB's code is not visible to the PC and cannot be read by any PC resident memory contents examination program. This code is not visible to the PC and since it is stored in the SEPB I486's Flash ROM it cannot be altered by any PC non-SEPB operation.

h. Mode #7(I)

If the I486 is operating in either Mode #0(I), Mode #1(I) or Mode #9(I) and detects a verification error it can perform a Jump into the Mode #7(I) code and switch the operating mode to Mode #7(I) by performing a Memory Write Operation with the address mapped to the FPGA logic. The SEPB can then execute the appropriate I/O Read and Write operations to cause the audible alarm to sound. After this the mode is switched to Mode #6(I) by the I486 code performing another Memory Write Operation with the address mapped to the FPGA logic. This parcel of the SEPB's code is not visible to the PC and cannot be read by any PC resident memory contents examination program. This code is also not visible to the PC and since it is stored in the SEPB I486's Flash ROM it cannot be altered by any PC non-SEPB operation.

i. Mode #9(I)

While operating in Mode #9(I) the I486 executes a memory write instruction with the appropriate FPGA address to cause the mode to switch to Mode #13(I). When the "Memory Write" bus cycle is started by the I486 the FPGA recognizes the address and does not send the bus cycle complete RDY# signal to the I486. As a result the I486 idles in its program execution and the FPGA sends the HOLD signal to the I486 to get it to free all buses and bus related control signals for the MYK-80 subsystem to use. When the MYK-80 subsystem send a "Command Completion" signal to the I486 Controller FPGA the FPGA restarts the I486 program execution by generating the RDY# signal and sending it to the I486 and release the HOLD signal.

If an error is detected during any one of the MYK-80 Command Execution Cycles, an error condition is returned to the trusted operator.

If no error is found the I486 code will make a transition to the execution of an additional portion of the SEPB's Mode #10(I) code. This transition, from Mode #9(I) to Mode #10(I), is made by the I486 executing the appropriate HALT Instruction. When the SALT Instruction is executed the I486 puts the signals out that alerts all units connected to the bus that the HALT Instruction has been executed by sending out the Special BUS Cycle control signals. When the multiprocessor logic controller recognizes that the I486 has executed the HALT Instruction and has sent out the Special Bus Cycle control signals signalling the Halt Operation it generates a Non-Maskable Interrupt, NMI, signal and sends it to the I486. In response to the receipt of the NMI signal the I486 fetches the Interrupt Response Destination Address to determine where to get the next instruction to execute and to make an operating mode switch to Mode #10(I). The Flash ROM address used to fetch the proper Interrupt Response Destination Address is generated according to the logic described in Table C-1 and Table C-2. Neither this parcel of the SEPB's I486 code nor the supporting MYK-80 code is visible to the PC. Neither of these code parcels can, therefore, be read by any PC resident memory contents examination. These code parcels are not visible to the PC since they are stored in the SEPB I486's Flash ROM and in the SEPB MYK-80's Flash ROM respectively they cannot be altered by any PC non-SEPB operation.

j. Mode #10(I)

This code is entered from the initial segment of the Mode #11(I) BIOS Extension code. This code directs the SEPB in performing the command sent to the SEPB from the user entry into the Trusted Operator Interface Program via the Mode #11(I) BIOS Extension code. Mode #10(I) is like Mode #2(I) in that if the command requires a direct disk access, then the SEPB goes from Mode #9(I) to Mode #10(I) (read disk) to Mode #9(I) to Mode #13(I) (check data). For each operation that the trusted operator requests the subsystem to perform, Mode #10(I) retrieves the command from the hard drive and puts it into a known location in PC memory, then goes to Mode #9(I). In Mode #9(I) the I486 asks the MYK-80 to retrieve the command from memory. The I486 then executes the command.

The second part of the hidden SEPB BIOS Execution code is also ended by the execution of a Halt Instruction. When the HALT Instruction is executed the I486 puts the signals out that alerts all units connected to the bus that the HALT Instruction has been executed by sending out the Special BUS Cycle control signals. When the multiprocessor logic controller recognizes that the I486 has executed the HALT Instruction and has sent out the Special Bus Cycle control signals signalling the Halt Operation it generates a Non-Maskable Interrupt, NMI, signal and sends it to the I486. In response to the receipt of the NMI signal the I486 fetches the Interrupt Response Destination Address to determine where to get the next instruction to execute and to make an operating mode switch to Mode #10(I). The Flash ROM address used to fetch the proper Interrupt Response Destination Address is generated according to the logic described in Table C-1 and Table C-2. Neither this parcel of the SEPB's I486 code nor the supporting MYK-80 code is visible to the PC. Neither of these code parcels can, therefore, be read by any PC resident memory contents examination. These code parcels are not visible to the PC since they are stored in the SEPB I486's Flash ROM and in the SEPB MYK-80's Flash ROM respectively they cannot be altered by any PC non-SEPB operation.

After the SEPB completes performing the operation defined by the contents of the message received from the Trusted Operator Interface Program this code executes another HALT Instruction. In response to the execution of the HALT instruction the I486 fetches the Interrupt Response Destination Address to determine where to get the next instruction to execute and to make an operating mode change to Mode #11(I). The Flash ROM address used to fetch the proper Interrupt Response Destination Address is generated according to the logic described in Table C-1 and Table C-2.

k. Mode #11(I)

This code provides the linkage between the Trusted Operator Interface Program and the SEPB firmware. When the user requests an operation be performed the Trusted Operator Interface Program will formulate a command message describing the action to be performed and deposit it into a standard location in the PC hard drive (or RAM). A program Call is then made to cause the program sequence to jump to the Mode #11(I) BIOS Extension code. The Mode #11(I) BIOS Extension code will the make a transition to the Mode #10(I) code to get the SEPB to read the command message, go to Mode #9(I) and perform the requested operation.

After each command received from the Trusted Operator Interface Program is processed by the SEPB it makes a transition back to the second part of this Mode #11(I) BIOS Extension code. Execution of this code is ended by the execution of a Return Instruction to transfer execution control back to the Trusted Operator Interface Program. This parcel of the SEPB's BIOS Extension code is visible to the PC and can be read by any PC resident memory contents examination program, as for example, a program such as the DOS Debug facility. However, since this code is stored in the SEPS I486's Flash ROM it cannot be altered by any PC non-SEPB operation.)

l. Mode #13(I)

While in Mode #13(I) the I486 is not executing a program. Rather it is waiting for the Memory Write Operation with the address mapped to the FPGA logic to be completed before going on. It is during this time that the SEPB's MYK-80 Subsystem is executing its code to perform the operation commanded by the I486. This parcel of the SEPB's code is not visible to the PC and cannot be read by any PC resident memory contents examination program. This code is not visible to the PC and since it is stored in the SEPB I486's Flash ROM it cannot be altered by any PC non-SEPB operation.

m. Mode #15(I)—Power On

This code is entered whenever a Hard Reset signal is generated such as upon Power On or when an operator presses the Reset button on the PC's control panel. Upon entering this mode the multiprocessor logic controller generates the signals to cause the I486 to perform its Built In Self Test, BIST, operation immediately after the Reset signal becomes inactive. Alternately, the MYK-80 is built to perform its Built In Self Test automatically after the Reset signal becomes inactive. After the I486 completes its Built In Self Test operation (which takes longer than required for the MYK-80 to complete its Built In Self Test operation, run the first segment of its SEPB firmware to test the SEPB hardware and memories, and then transition to Mode #0(M) and have the multiprocessor logic controller stop its clock) it starts executing code stored in the SEPB Flash ROM. Normally, the I486 would begin its code execution by fetching the first part of the PC System Initialization Code from memory address 0XFFFFFFF0. With the SEPB in place the multiprocessor logic controller redirects the code fetch operation to obtain this code from the SEPB I486 Power On code storage in the I486's SEPB Flash ROM.

The four doublewords of this code parcel consist of a Jump to the entry point of the code for Mode #0(I). When this Jump is made the mode of the Control State Machine changes to Mode #0(I). This parcel of the SEPB's code is not visible to the PC and cannot be read by any PC resident memory contents examination program. It is also stored in the SEPB I486's Flash ROM so that it cannot be altered by any PC based program.

Non-Maskable Interrupt Address Generation

The I486 Controller contains logic to generate the address that is sent to the I486's Flash ROM to read the Interrupt Response Vector. This address is composed five different parts and is eighteen bits long. The most significant four of the six least significant address bits generated by the I486 are sent directly to the Flash ROM, as address bits 0 through 3, at all times and are, therefore, in this case, equal to 2. The two least significant address bits generated by an I486 program or by its hardware are decoded to form the four byte selection signals for the memory. Since this operation is a Doubleword read operation these signals are all put into the active state.

The second group of address bits, bits 4 through 7, are equal to the I486 program generated address bits 6 through 9 except when the I486 is reading the Interrupt Response Destination Address. In this latter case these four bits are set to be equal to the values programmed into the SEPB as the BIOS Extension Address. Flash Address bit 6 is equal to the setting of BIOS Extension Address Switch 0, etc.

For the Interrupt Response Destination Address read operation the third group of address bits, bits 8 through 10, are set to be equal to the I486 program generated address bits 10 through 12 of the last instruction fetched before the HALT Bus Cycle is generated by the I486. These bits generate responses for eight interrupts, i.e., HALT Instruction Executions within each parcel of code. They are derived from the address bits generated by the I486 such that the number of vectors is either four or eight even though the address space is not always the same for each parcel of code. This means that the number of vectors must be limited to one in each eighth of the address space for that parcel of code. Table C-1 lists all of the combinations built into the SEPB I486 logic.

The next most significant three bits of the address sent to the I486's Flash ROM are an encoding of the Mode Transition Information that the I486 Controller generates. Individual values are generated for these three bits of the Flash ROM address depending on which Mode the logic is operating in and which Mode the logic will transition to as a result of performing the NMI. Table C-2 describes the logic used to generate the Flash ROM address bits.

The remaining Flash ROM address bits are hard wired such that, during an Interrupt Response Destination Address read operation Flash ROM address bit 14 is equal to a 0, bit 15 is equal to a 1 and bit 16 is equal to a 0.

TABLE C-1

| I486 Operating Mode | I486 Destination Mode | Address Space | Program Generated Address Bits Used |
|---|---|---|---|
| 1 | 2 | 0xFFFFxxxx Through 0xFFFFFFFF | 13 Through 15 |
| 2 | 1 | BIOS Extension Baseline Plus 2 KB Through BIOS Extension Baseline Plus 8 KB | 9 and 10 |
| 2 | 11 | BEB Plus 2 KB Through BEB Plus 8 KB | 9 and 10 |
| 3(or11) | 2 | BEB Through BEB Plus 0.5 KB | 7 and 8 |
| 9 | 10 | 0xFFFFxxxx Through 0xFFFFFFFF | 13 Through 15 |
| 10 | 9 | BEB Plus 2 KB Through BEB Plus 8 KB | 9 and 10 |
| 10 | 11 | BEB Plus 2 KB Through BEB Plus 8 KB | 9 and 10 |
| 11 | 2 | BEB Through BEE Plus 2 KB | 9 and 10 |
| 11 | 10 | BEB Through BEB Plus 2 KB | 9 and 10 |

TABLE C-2

| I486 Operating Mode | I486 Destination Mode | Flash ROM Address Bits | Value |
|---|---|---|---|
| 1 | 2 | 11 | 0 |
|  |  | 12 | 1 |
|  |  | 13 | 1 |
| 2 | 1 | 10 | 1 |
|  |  | 11 | 0 |
|  |  | 12 | 0 |
|  |  | 13 | 0 |
| 2 | 11 | 10 | 0 |
|  |  | 11 | 1 |
|  |  | 12 | 0 |
|  |  | 13 | 0 |
| 3(or11) | 2 | 10 | 0 |
|  |  | 11 | 1 |
|  |  | 12 | 1 |
|  |  | 13 | 0 |
| 9 | 10 | 11 | 1 |
|  |  | 12 | 0 |
|  |  | 13 | 1 |
| 10 | 9 | 10 | 1 |
|  |  | 11 | 1 |
|  |  | 12 | 0 |
|  |  | 13 | 0 |
| 10 | 11 | 10 | 0 |
|  |  | 11 | 0 |
|  |  | 12 | 1 |
|  |  | 13 | 0 |
| 11(or 3) | 2 | 10 | 0 |
|  |  | 11 | 1 |
|  |  | 12 | 1 |
|  |  | 13 | 0 |
| 11 | 10 | 10 | 1 |
|  |  | 11 | 0 |
|  |  | 12 | 1 |
|  |  | 13 | 0 |

Operational Overview

The present Security Enhanced Processor Board, or SEPB, provides Personal Computers and Servers with positive software configuration control. In the embodiment shown, a SEPB is installed in an Intel XPress Chassis Personal Computer using an Intel 80486 (I486), to provide both automatic and user requested verification of the PC's components.

In operation, the SEPB begins when the Host PC is turned on and is repeated each time the Host PC is reset. Some I486 PC and BIOS combinations have both a hard reset, generated by power on or by pushing the RESET button, and a soft reset, generated by simultaneously depressing the Control (Ctrl), the Alternate (Alt), the Delete (Del) keys on the keyboard. The soft reset does not reset the I486. but the system instead re-enters the System Initialization.

The SEPB, upon each system hard reset, performs Step 1 of its operation cycle, which begins with the SEPB capturing the operation of the PC and the I486 and performing hardware self tests on the I486 and on its own components. If any of the hardware tests fail the SEPB stops all operations of the PC. If any of the hardware tests or any of the Secure Verification tests fail the SEPB stops all operations of the PC such that the only way to restart the PC is to generate a hard reset signal within the PC; and consequently, reinitiate the SEPB tests of the SEPB's and the PC's hardware and firmware and tests of PC disk or RAM resident files as before.

Upon successful completion of the self tests, but before the PC is allowed to execute its system initialization, the SEPB performs Step 2 of its operation. It does this by executing SEPB firmware on the I486 to direct an MYK-80 to perform Secure Verification tests on portions of SEPB's firmware and on portions of the PC's firmware, as previously designated by a trusted operator (discussed below). If any of these Secure Verification tests fail the SEPS stops all operations of the PC as before.

If the PC is reset using the keyboard initiated soft reset (by the operator simultaneously pressing the Control, the Alternate and the Delete keys) the SEPB and the I486 are not reset. Consequently, the hardware and the System Initialization Firmware Secure Verification tests of Step 1 and Step 2 of the SEPE's operation are not performed. Instead, the PC system initialization operations are restarted and the operation of the SEPB is reset to Step 3 in its operation cycle.

Following successful system initialization performs Step 3 of its operation. Step 3 consists of the SEPB performing Secure Verification tests, prior to PC operating system (OS) Boot, on certain PC files that should not be effected by the PC being reset; such as the PC's Operating System, OS, Disk Boot Sector contents and any other files, as previously designated by a trusted operator. If any of these Secure Verification tests fail the SEPB stops all operations of the PC as before.

If all verification tests are passed the SEPB goes to Step 4 of its operation by configuring the connections between the I486 and the remainder of the PC such that the system performs just as the PC would perform if the SEPB were not present.

Trusted Operator Interface

A PC goes through three steps to prepare it to execute application programs. Step 1 is the hardware initialization which starts with a reset and is typically followed by a built-in self test. Step 2 is the system initialization which is performed by the BIOS program. Step 3 is the boot of the operating system.

To enable a trusted operator (TO) to specify which components of the SEPB's firmware and the PC Is firmware and which files stored on one of the PC's disks will be protected (and at which step each protected component will be verified), a Trusted Operator Interface Program is provided with the SEPB. The Trusted Operator Interface Program, which runs under DOS on the PC and will, when executed, provide the trusted operator with a convenient mechanism to designate which information files (BIOS, interrupt table, DOS, autoexec.bat, config.sys, etc.) are to be signed with a Digital Signature (or some equivalent modification detection code) and when (at which of three steps indicated below) those signatures are to be verified.

FIG. 10 illustrates the choices provided to the trusted operator by the Trusted Operator Interface Program. For each of the information files above a critical program area 1002 is selected, and a verification timing 1004 for that critical program area is selected 1004. The trusted operator can also specify 1012 that the tests be performed either automatically, or manually upon a PC operator's initiated request.

For each test the trusted operator specifies 1004 the timing of the test by selecting one of the following:
a. Perform the test automatically as a part of Step 2 of the SEPB's operation (after the hardware tests are completed but prior to system initialization—1006 in FIG. 10)
b. Perform the test automatically as a part of Step 3 of the SEPB's operation (after system initialization but prior to Operating System boot—1008 in FIG. 10)
c. Perform the test during Step 4 of the SEPB's operation when the Trusted Operator Interface Program is being executed and then only as requested by the trusted operator (or any operator)—1010 in FIG. 10.

The Trusted Operator Interface Program provides the mechanisms to allow the trusted operator to request that a previously generated Digital Signature be updated to correspond to the latest configuration of the Information File or deleted from the list of files that are to be tested. The trusted operator may also request that all previously designated Secure Verification tests be canceled and may change the Cryptographic Values the SEPB will use to generate and verify Digital Signatures.

The trusted operator may also control who and how he or others are designated as having Trusted Operator privileges by entering approved user names and the personal identification number, PIN, that a new user is to use to identify himself to the Trusted Operator Interface Program. The trusted operator may also delete previously entered user names from the list of those that may execute this trusted operator Interface Program.

Once approved to execute the Trusted Operator Interface Program a user may change his Personal Identification Number at any time to prevent any unauthorized user exercising the privileges he has been granted.

To provide a convenient method for a system administrator to request that the SEPB Sign a file, the Trusted Operator Program was developed to execute under DOS after all of the set-up steps have been performed. The Trusted Operator Program provides an interface to the trusted operator to determine which of nine possible operations the trusted operator wishes the SEPB to perform. After this information is entered the Trusted Operator Interface Program puts the data for the operation into known locations in the PC's hard disk and prepares a message in the standard format for the SEPB. The Trusted Operator Interface Program then calls the SEPB BIOS Extension program. The BIOS Extension program requests that the SEPE MYK-80 subsystem read the data from the PC's RAM and make it available to the SEPB I486 subsystem. The hidden parts of the SEPB BIOS Extension program and the private I486 and MYK-80 SEPB firmware then direct the SEPB through the appropriate steps to perform the requested operation.

Figure 6:
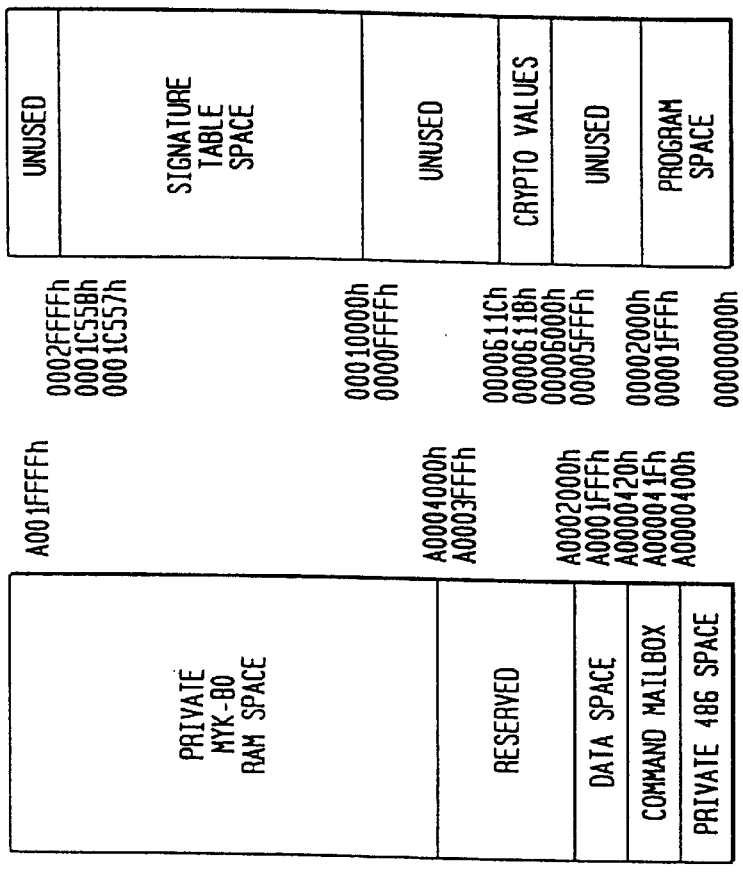
FIGS. 6 and 7 are memory allocation maps for the memory space of the I486 CPU, RISC coprocessor (MYK-80) and daughter board Flash RAM's.
Figure 7:
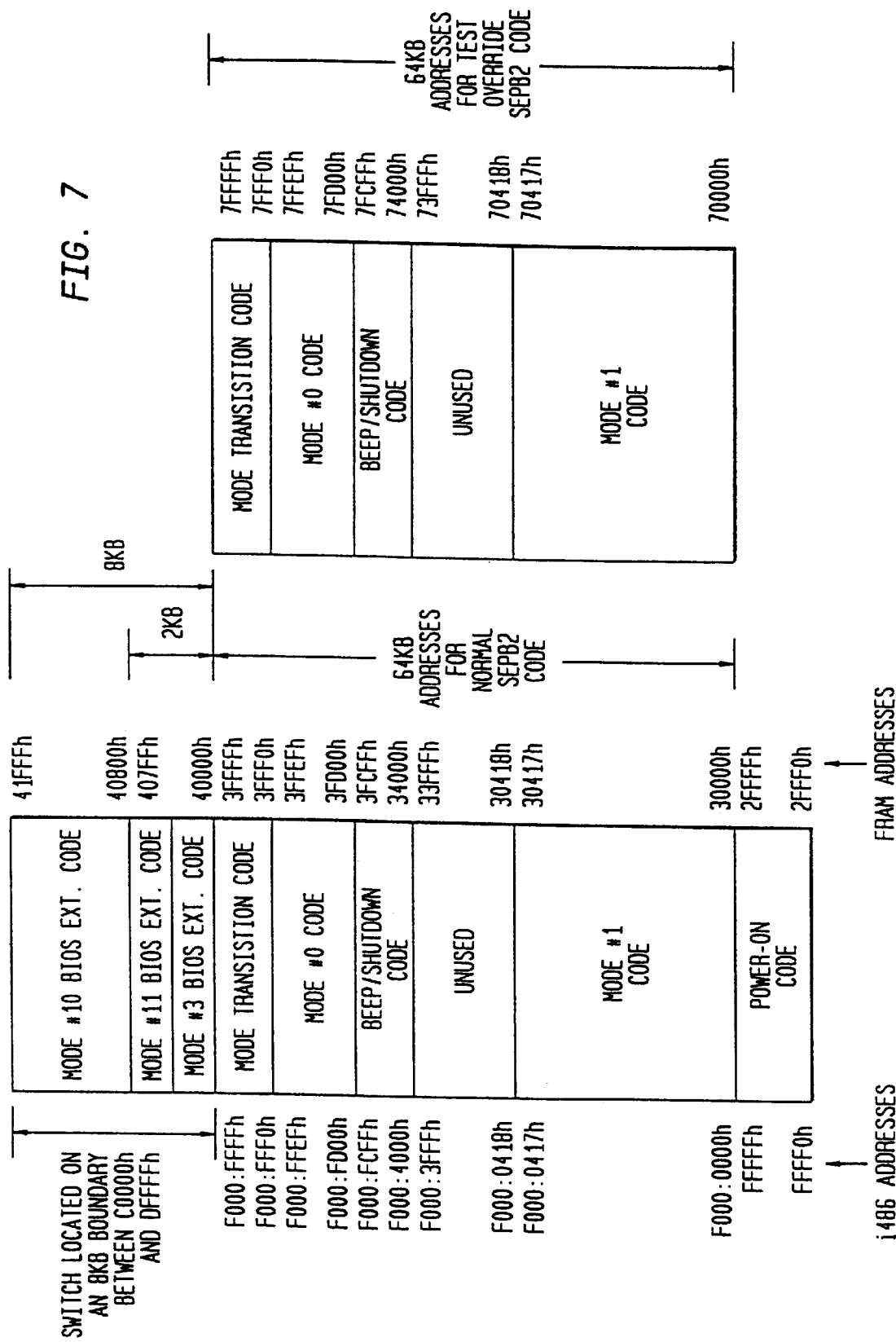

As shown in FIGS. 6 and 7, the I486 CPU and the MYK-80 (mapped by the multiprocessor logic controller based on the operating Mode) have different memory address spaces to address the various SEPB and PC memories. The use of separate memory address spaces prevents the PC's components from having access to the SEPB memory contents, (except for small portions of the BIOS Extension Code), and thereby prevents the CPU from gaining access to the MYK-80 tables. At the same time the MYK-80 is allowed access to all CPU Flash ROM contents, PC RAM and ROM contents and all SRAM locations (except for the private I486 SEPB SRAM space). The use of physically separate memory address spaces for the CPU and MYK-80 as mapped by the multiprocessor logic controller, combined with the ability of the multiprocessor logic controller to intercept the control lines of the I486 CPU provides the high level of confidence in the security of the present coprocessor arrangement.

A failure in any one of the Digital Signature Verification tests performed automatically will result in a) The system producing an audible alarm, and b) A shut down of the PC to await repair.

A failure in any Digital Signature Verification test performed at the request of the operator will result in ) The Trusted Operator Interface Program producing an audible alarm, and c) The displaying of a "FAIL" message on the system monitor.

It should be noted that when a failure occurs during the performance of a Trusted Operator requested Digital Signature Verification test the system will not automatically shut down.

Instead, the Trusted Operator Interface Program will continue to execute while it awaits further input from the operator.

Operation

As shown in FIG. 2 and FIG. 3 both microprocessor subsystems on the SEPB will initially begin operation in a power-on/reset mode; the I486 Subsystem (FIG. 2) in Mode #15(I) and the MYK-80 Subsystem (FIG. 3) in Mode #3(M). The I486 Subsystem begins operation by having the I486 perform its Built In Self Test (BIST). At the same time, the MYK-80 Subsystem begins its operations with the ARM6 microprocessor built into the MYK-80 executing its own Built In Self Test followed automatically by the execution of some program segments that test the subsystem's components and then initializes the SRAM 26 (in FIG. 1) by copying some of its program components from the MFROM 28 (in FIG. 1) to the SRAM 26. The MYK-80 program will then command the subsystem to deactivate by transitioning to Mode #0(M) and wait in this mode until the I486 Subsystem commands it to perform some operation before it transitions to Mode #1(M) and becomes active again.

When the I486 completes its BIST cycle it transitions to Mode #0(I) and starts its system verification operations. The first operation it performs is to post a command message in the SRAM 26. Having posted a command message, the I486 executes an intersystem level command that deactivates the I486 subsystem, making it transition to Mode #4(I), and activates the MYK-80 subsystem by making its transition from Mode #0(M) to Mode #1(M).

While in Mode #1(M) the MYK-80 Subsystem executes a program that sends a Software Interrupt, SWI, to the MYK-80 to command it to perform an internal Self Test cycle, that is, an MYK-80 Self Test (STEST) operation. When the MYK-80 is interrupted to perform any internal operation, the subsystem transitions to Mode #2(M) and puts all connections to the Processor's Address Bus and the Processor Data Bus into high impedance states.

After the MYK-80 has completed its STEST operation it causes the subsystem to transition back to Mode #1(M). While in this mode the subsystem reads the results of the STEST operation from one of the ARM6 General Registers and posts the results into a standard location of the SRAM 26 for the I486 to read. The MYK-80 completes this cycle of its operation by executing an intersubsystem level command that deactivates its subsystem, making it transition to Mode #0(M), and activates the I486 Subsystem by making it transition to Mode #0(I).

If the results of the MYK-80 STEST operation indicate a failure the I486 will execute a Shutdown operation by causing the subsystem to transition to Mode #7(I), to sound the audible alarm, and then to Mode #6(I), to execute an I486 Shutdown command.

If the results of the MYK-80 STEST operation indicate that the cycle was completed successfully the I486 will continue its SEP.

Operation Prior to BIOS Initialization

Following the successful completion of the MYK-80 Self Test the I486 will begin its operations that enable it to verify the contents of the PC's Read Only Memories. For these operations the SEPB's I486 Subsystem executes its firmware in Mode #0(I).

To direct these operations the I486 maintains a table in its Flash ROM 30, Table A, that contains entries describing the sections of the SEPB's ROMs and the PC's ROMs for which Digital Signatures have previously been generated. The hashing and signing were performed by the MYK-80 with the produced signature values in a table that the MYK-80 maintains in its Flash ROM. These same sections of the SEPB's ROMs' contents and the PC's ROM's contents are now to be hashed again and then run through Digital Signature Verification tests by the MYK-80 prior to PC system initialization with the signature values compared to the signature values created when the ROM's contents were signed.

(In the present SEPB implementation there is only one table in the MYK-80 Flash ROM for storing Digital Signature Table Entries. Because of the size of each entry and the need to limit this table to one Flash ROM sector the system is limited to have a maximum of 300 signatures. Further the maximum file size is limited to 65 KB because of space limitation in the SRAM. To expand the system to handle larger files a number of changes were made to the MYK-80 firmware. One of these has the generation of the Secure Hash Value performed on relatively small sections of the file linking the operation segments into one for the full file. This in turn reduces the maximum number of Digital Signatures that may be held in one Signature Table to something considerably less than 300. In order to overcome this limitation a change to using three Digital Signature Tables, one for A Table Tests, one for B Table Tests and one for C Table Tests was suggested, examined and found to be satisfactory and easily implementable; even when the Flash ROMs for the I486 and the Flash ROMs for the MYK-80 are combined into an integrated SEPB Flash ROM.)

Prior to calling the MYK-80 to perform any Digital Signature verification operations the I486 posts the appropriate Command Message in the proper locations of the SRAM 26. Having posted the Command Message, the I486 executes an intersubsystem level command that deactivates its subsystem, making it transition to Mode #4(I), and activates the MYK-80 Subsystem by making it transition to Mode #1(M). To perform Digital Signature Verification tests the MYK-80 must be commanded to perform two operations. The first is a common operation, Verify Setup, which transfers a copy of the SEPB cryptographic values from the MYK-80's Flash ROM to the MYK-80's internal RAM, the results of which are then used for one or more subsequent Digital Signature Verification tests until the SEPB is reset or until another Verify Setup operation is performed.

While in Mode #1(M), for the Verify Setup operation, the MYK-80 Subsystem executes a program that copies the Cryptographic Values from its Flash ROM 28 and puts them into a standard area in its SRAM 26. It then sends a Software Interrupt, SWI, to the MYK-80 to command it to perform a Load Cryptographic Values, DSSP, operation. When the MYK-80 is interrupted to perform this internal operation the subsystem transitions to Mode #2(M) and puts all connections to the Processor Address Bus and the Processor Data Bus into high impedance states. After the cryptographic operation is completed the MYK-80 subsystem transitions back to Mode #1(M), copies the results of the DSSP operation from one of the ARM6 General Registers and posts the results into a standard location of the SRAM for the I486 to read. The MYK-80 completes this cycle of its operation by executing an intersubsystem level command that deactivates its subsystem, making it transition to Mode #0(M), and activates the I486 Subsystem by making it transition to Mode #0(I).

To perform a Digital Signature Verification operation the I486 posts the appropriate Command Message in the proper locations of the SRAM 26. Having posted a Command Message the I486 executes an intersubsystem level command that deactivates its subsystem, making it transition to Mode #4(I), and activates the MYK-80 Subsystem by making it transition to Mode #1(M). The MYK-80 then reads the file's present contents from the PC's memory and puts them into a standard area in its SRAM 26. The MYK-80 firmware then sends a Software Interrupt, SWI, to the MYK-80 to command it to perform a Secure Hash (SHA) cryptogrpahic operation. When the MYK-80 is interrupted to perform this internal operation the subsystem transitions to Mode #2(M) and puts all connections to the Processor Address Bus and the Processor Data Bus into high impedance states.

After the MYK-80 has completed its SHA operation, when performing a Digital Signature verification operation, it causes the subsystem to transition back to Mode #1(M). While in this mode the subsystem reads the results of the SHA operation and sends the updated hash value, along with the file's previously generated Digital Signature values and a cryptographic key public component, yb, generated from the same cryptographic values used to generate the Digital Signature to the MYK-80. The MYK-80 is then commanded to execute the Digital Signature Verification, DSVER, cryptographic operation to verify the input signature. The MYK-80 firmware then sends a Software Interrupt, SWI, to the MYK-80 to command it to perform the DSVER operation. When the MYK-80 is interrupted to perform this internal operation the subsystem transitions to Mode #2(M) and puts its connections to the Processor Address Bus and the Processor Data Bus into high impedance states. The result of the test is then posted into a standard location of the SRAM 26 for the I486 to read. The MYK-80 completes this cycle of its operation by executing an intersubsystem level command that deactivates its subsystem, making it transition to Mode #0(M), and activates the I486 Subsystem by making it transition to Mode #0(I).

If the result of the MYK-80 Digital Signature Verification test operation indicates a failure the I486 will sound the audible alarm and then execute a Shutdown operation by causing the subsystem to transition to Mode #7(I) and then to Mode #6(I) In this latter mode the I486 is shut down and it remains so until the PC system is reset by cycling the power off and then on again or by a user pushing the PC's Reset button.

If the results of the MYK-80 Verify operation indicate that the cycle was completed successfully the I486 will continue its SEPB operations.

After each entry of the I486's Table A is processed successfully the I486 will examine the Table to determine if another entry exists that describes a file that is to be verified before PC System Initialization. If another entry exists the I486 repeats the previous operations of posting a new command message, describing the file to be verified, in the proper locations of the SRAM 26. The I486 then calls the MYK-80, as before, to perform the Digital Signature Verification operation and to post the results into the standard location of the SRAM 26 for the I486 to read.

When there are no more entries in Table A to be verified the I486 will terminate its Mode #0(I) operations and transition to Mode #3(I). In Mode #3(I) the I486 will be connected to the PC and its operations will be transparent to the SEPB.

When the I486 makes this transition to Mode #3(I) it enters the PC ROM in the same manner it would after Power-On Reset if the SEPB were not present. That is, the first operation performed by the I486 will be that of fetching an instruction to execute from address 0xFFFFFFF0 and then proceeding to execute the System Initialization firmware of the BIOS.

In many systems the contents of the System Initialization ROM (Flash ROM or EEPROM) are compressed. When the system is initialized the BIOS is expanded into the PC's RAM for execution from there. If you address the System Initialization code before initialization you see the contents of the ROM, the compressed form of the code. If you address the System Initialization code after initialization you see the contents of the PC's RAM, the expanded code. If you sign the System Initialization code after initialization and then test the code before initialization, as it should be, the test will always fail. In order to make the test pass the signing of system components for Level A tests must be performed, where the tests will be run. The SEPB has been modified to store the Trusted Operator Sign Command Information in the I486's Flash ROM and then insist that the TO reset the system to make it generate the proper signature for the component to be tested at level A.)

It should also be noted that if there is a failure in testing a system component at level A or level B the system will not boot. Resetting the system will result in the same shutdown and not give the TO the ability to correct the problem. In response to this problem the SEPB has a bypass jumper that when put into a secondary position allows the system to bypass both the level A and level B tests and boot the OS. To make sure that it is the TO that is performing this operation the SEPB replaces the level B tests with a test to verify the TO's user name and PIN. If the jumper is in the correct place and the TO is properly identified the system will boot allowing the TO Interface Program to run giving the TO the opportunity to fix the problem.)

(It should also be noted that, for some cryptographic operations, usually ones that do not produce an output such as DSSP, Verify Setup, etc. the MYK-80 does not have a PASS/FAIL indication in its ARM6 General Register. In this case the SEPB generates a pseudo PASS/Fail indication that only indicates that the execution of this section of the firmware was completed successfully.)

Transition from System Initialization Back to SEPB Operation

After the PC has completed its System Initialization its normal path of operation would be to load the Operating System. For a Trusted Computer System the Operating System should be subjected to a verify operation, like those previously performed on the PC's ROM's contents, prior to allowing the system to be used by an operator. Performing Operating System verify operations, however, requires that, after the system initialization is complete but prior to OS boot, the PC be "recaptured" by the SEPB.

In a PC system the System Initialization code, near the end of its execution cycle, checks the contents of selected locations in the PC's memory from addresses C0000h to DFFFFh to determine if there is present in the PC any device that has the firmware to extend the system BIOS by providing its own unique I/O service operations. Such extension of the system BIOS is detected by the System Initialization code reading the contents of each doubleword at the beginning of each 2 KB segment of the PC's memory between the addresses for these devices and checking to see if it follows the standard convention. If the System Initialization firmware finds one of these devices, execution control is then passed to its code. When this code is executed the I/O device is set up and all entries in the PC's System Tables are generated and stored in the proper locations. After execution of this code has been completed execution control will be passed back to the System Initialization code which will continue its search for BIOS Extension Devices. After all BIOS Extensions have been detected and setup execution control will be transitioned to the OS Boot process in the prescribed manner.

The program stored in the SEPB's Flash ROM appears to the PC to look like a BIOS Extension device. When the SEPB BIOS Extension code executes for system initialization it performs a transition to other SEPB firmware to determine if additional Digital Signature Verification tests, such as on the Operating System Boot Sector, are to be performed. This transition causes the I486 subsystem to switch its operation from Mode #3(I) to Mode #1(I). Mode #2(I) is only a bridge in this case.

While operating in Mode #1(I) the I486 will determine if tests are to be run and where in the system the information resides that is to be tested. If a test is to be made on the contents of a file that resides on one of the system's disk the I486 subsystem will transition to a hidden portion of the BIOS extension Mode #2(I), one that cannot be seen from the PC but one that can command that the PC perform operations to read the disk and put the file into the PC's RAM. This transition causes a switch back to Mode #1(I) to test the data.

The SEPB firmware uses a unique approach to make the desired transitions in the I486 execution cycle from executing an SEPB program, the Mode #1(I) programs, to executing a visible or a hidden BIOS Extension program, the Mode #3(I) or the Mode #2(I) programs. This mechanism is activated by the I486 executing a Halt instruction in the program stored in the SEPB's Flash Memory. In response to the Halt instruction being executed the SEPB logic changes the I486 Subsystem operating mode as desired and then issues a Non-Maskable Interrupt, NMI, signal to the I486 to restart its program execution.

In response to the receipt of the NMI signal the I486 performs an Interrupt Response Vector fetch operation. In normal PC operation the vector fetched by the I486 would be read from the PC's RAM at a location 8h. In the SEPB system, if the Halt Instruction has been executed by an SEPB program the Interrupt Response Vector is taken from the appropriate location in the SEPB I486 Subsystem Flash ROM. The I486, in response to an NMI signal, generates an address of 8h with which to reference memory to get the interrupt vector. This address normally refers to the Interrupt Vector Table put into the lowest bytes of RAM by the BIOS during System Initialization. The I486 bus cycle to fetch the interrupt vector occurs under hardware control as a Special Bus Cycle.

When the SEPB recognizes that the halt instruction that caused the NMI signal to be generated was executed from the SEPB I486 Subsystem's Flash ROM, it modifies the I486 generated address of the interrupt response cycle to make it point to one of several sets of locations in the I486 Flash ROM Table Space; addresses 20008h through 2F008h. The addresses generated by the SEPB hardware are made up by using various information derived from the I486 firmware execution, the I486 Subsystem's Operating Mode and the SEPB's BIOS Extension address to get the proper address at which to resume executing the SEPB's firmware.

The Interrupt Response Vector contains a pair of numbers, a Code Segment Number and an Offset Number that the I486 uses to vector its operation to by fetching the instruction stored at the address created by properly combining these two numbers. When the SEPB is making a program transition the next instruction is fetched from the proper location in the SEPB's Flash ROM code storage segment.

Operation After BIOS Initialization but Prior to OS Boot

Following the transition of operation back to the SEPB firmware the I486 will resume its operations of verifying the PC software/firmware. For these operations the SEPB's I486 Subsystem executes its firmware in Mode #1(I).

To direct these operations the I486 maintains a second table in its Flash ROM, Table B, that contains entries describing items such as the PC's OS disk boot sector contents and any other PC information that is to be verified at this time. All of these will have Digital Signatures that have been previously generated by the MYK-80 with the produced Digital Signature values stored in the same MYK-80 table that was described previously. These same sections of the PC's Disk, ROM and RAM contents are now to be checked by the MYK-80 prior to PC system initialization to insure that they still have the same Digital Signature value as the value that was created when the contents were signed.

Prior to calling the MYK-80 to perform the Digital Signature Verification operations the I486 posts the appropriate Command Message in the proper locations of the SRAM 26. Having posted the command, the I486 executes an intersubsystem level command that deactivates its subsystem, making it transition to Mode #5(I), and activates the MYK-80 Subsystem by making it transition to Mode #1(M).

While in Mode #1(M) the MYK-80 Subsystem executes a program that sends a Software Interrupt, SWI, to the TMYK-80 to command it to perform a Secure Hash Cryptographic Operation. When the MYK-80 is interrupted to perform any internal operation the subsystem transitions to Mode #2(M) and puts all connections to the Processor Address Bus and the Processor Data Bus into high impedance states.

Digital Signature Verification

To perform a Digital Signature Verification operation the I486 posts the appropriate Command Message in the proper locations of the SRAM 26. After posting the Command Message, the I486 executes an intersubsystem level command that deactivates its subsystem, making it transition to Mode #5(I), and activates the MYK-80 subsystem by making it transition to Mode #1(M). The MYK-80 then reads the file's present contents from the PC's memory and puts them into a standard area in its SRAM 26. The MYK-80 firmware then sends a Software Interrupt, SWI, to the MYK-80 to command it to perform a Secure Hash, SHA, cryptographic operation. When the MYK-80 is interrupted to perform this internal operation the subsystem transitions to Mode #2(M) and puts all connections to the Processor Address Bus and the Processor Data Bus into high impedance states.

After the MYK-80 has completed its SHA operation, when performing a Digital Signature verification operation, it causes the subsystem to transition back to Mode #1(M). While in this mode the subsystem reads the results of the SHA operation and sends the updated hash value, along with the file's previously generated Digital Signature values and a cryptographic key public component, yb, generated from the same cryptographic values used to generate the Digital Signature to the MYK-80. The MYK-80 is then commanded to execute its Digital Signature Verification, DSVER, cryptograhic operation to verify the input signature. The MYK-80 firmware then sends a Software Interrupt, SWI, to the MYK-80 to command it to perform the DSVER operation. When the MYK-80 is interrupted to perform this internal operation the subsystem transitions to Mode #2(M) and puts all connections to the Processor Address Bus and the Processor Data Bus into high impedance states. The result of the test is then posted into the standard location of the SRAM for the I486 to read. The MYK-80 completes this cycle of its operation by executing an intersubsystem level command that deactivates its subsystem, making it transition to Mode #0(M), and activates the I486 Subsystem by making it transition to Mode #1(I).

If the result of the MYK-80 Digital Signature Verification test operation indicates a failure the I486 will sound the audible alarm and then execute a Shutdown operation by causing the subsystem to transition to Mode #7(I) and then to Mode #6(I). In this latter mode the I486 is shut down and it remains so until the PC system is reset by cycling the power off and then on again or by a user pushing the PC's Reset button.

If the results of the MYK-80 Verify operation indicate that the cycle was completed successfully the I486 will continue its SEPB operations.

After each entry of the I486's Table B is processed successfully the I486 will examine the Table to determine if another entry exists that describes a file that is to be verified before PC OS boot. If another entry exists the I486 repeats the previous operations of posting a new command message, describing the file to be verified, in the proper locations of the SRAM 26. The I486 then calls the MYK-80, as before, to perform the verify operation and to post the results in the proper location of the SRAM 26. If disk read is needed, then the controller goes to Mode #2(I) to read, and back to Mode #1(I) to test the data.

When there are no more entries in Table B to be verified the I486 will terminate its Mode #1(I) operations and transition to Mode #11(I) via Mode #2(I). In Mode #11(I) the I486 will execute a return to PC operation where its operations will be transparent to the SEPB. That is, all normal PC OS functions are now available to the user.

PC and SEPB Operations to Sign a File

A separate program provides a convenient mechanism for an operator to sign a file and include its verification as a part of all subsequent start up processes. When this program execution starts the SEPB I486 Subsystem will be operating in Mode #11(I). Following the entry of the run command, the program will communicate with the trusted operator.

BIOS Extension Intercept Method

The goal is to capture the PC after the System BIOS has initialized the hardware, but before it boots the operating system. At that time, the System BIOS performs a search for BIOS Extensions. If it finds one, a call is made to that BIOS Extension so that it can do its initialization. After the BIOS Extension has completed its tasks the PC returns to the System BIOS.

Rather than adding a board to the PC Expansion Bus with a SEPB BIOS Extension on it, the preferred approach is to assign a BIOS Extension address to the SEPB logic, and have it monitor the I486 CPU read requests when it is looking for BIOS Extensions. For this, the SEPB has a set of switches to allow the installer to select, for the SEPB, an unused standard BIOS Extension address. Alternately, the switches can be eliminated by programming the SEPB to find an unused BIOS Extension address when system initialization is going on, and then automatically installing itself at that unused BIOS Extension address.

After the System BIOS finds the SEPB BIOS Extension it will execute its firmware to initialize the SEPB. This initialization will be the time that the SEPB will read the OS Boot Sector from the Hard Disk and verify it.

In all cases, when the BIOS Extension software is executed it will use the same halt/interrupt technique used before to gain access to the SEPB firmware. When the halt/interrupt operation is commanded by the SEPB, the code will have been fetched from the SEPB's Flash ROM. This combination of status information will allow the SEPB to transition to the SEPB Mode #1(I) in order to perform the OS Boot Sector Verification operation, a File Verification operation or one of the Trusted Operator requested operations.

Thus, a system and method in accordance with the present invention provides a trusted computer environment. By insisting that each time the system is turned on or reset, all software and firmware components have signatures the same as when they were signed, attempts to make unauthorized changes to a component will be detected before any such change can affect system operation. By intercepting and replacing certain of the control signals to the CPU, the arrangement of the present invention provides that no untrusted software has an opportunity to run. As the system software is verified in stages, the CPU is permitted to run more and more of the verified system software.

After each cycle of Digital Signature Verification tests are performed and passed, the SEPB logic will configure the connections between the I486 and the remainder of the Host PC such that the Host PC system will perform just as if the SEPB were not present. If, during any one of the Digital Signature Verification test cycles one tested component fails, the SEPB stops all operations, for both itself and for the Host PC. All of the operations of self test, Digital Signature Verification tests and system control performed by the SEPB are done so without notification to the user and appear to be part of the normal PC initialization and Boot operations. In this manner, the Host PC system cannot be used for any purpose (except for trusted operator repair) until all of its firmware and software components are restored to the proper configurations that make it a Trusted Computer System.

What is claimed is:

1. In a computer system including a central processor unit, said central processor being plugged into a first socket on a first circuit board, said central processor unit having respective address signals, data signals and a plurality of control signals coupled thereto through said first socket, said plurality of control signals provided to/from said central processor unit on a respective plurality of control signal lines including a first control signal line being one of said respective plurality of control signal lines, said first control signal line including a first control signal, a method for enhancing the security of said computer system, said method comprising:

removing said central processor unit from said first socket;

replacing said central processor by plugging a module into said first socket, said module further having a second socket substantially identical to said first socket;

plugging said central processor unit into said second socket on said module; and intercepting said first control signal.

2. A method in accordance with claim 1, wherein said step of intercepting said first control signal comprises:

disconnecting said first control signal line from said central processor unit;

substituting a second control signal to/from said central processor unit in place of said first control signal by interposing said second control signal on said first control signal line.

3. A method in accordance with claim 1, wherein said first control signal is a clock signal.

4. A method in accordance with claim 1, wherein said first control signal is a interrupt signal.

5. A method in accordance with claim 1, wherein said first control signal is a write strobe signal.

6. A method in accordance with claim 1, wherein said first control signal is a read strobe signal.

7. A method in accordance with claim 1, wherein said first control signal is a data ready signal.

8. A method in accordance with claim 1, wherein said module comprises a multi-chip module.

9. A method in accordance with claim 1, wherein said module comprises an Application Specific Integrated Circuit (ASIC) module.

10. A method for providing computer security, comprising the steps of:
   providing a first processor having a plurality of terminals for receiving a first plurality of control signals coupled thereto;
   providing a second processor;
   preventing, with a multiprocessor logic controller, reception of at least one of said first plurality of control signals by said first processor and substituting at least one of a second plurality of control signals in place of said one of said first plurality of control signals, and
   selectively enabling said first processor and said second processor, respectively, wherein, during said preventing reception, said multiprocessor logic controller assigns a second memory address space to said second processor and a first memory address space to said first processor, and wherein said second memory address space is non-accessible to said first processor.

11. A method in accordance with claim 10, wherein said one of said first plurality of control signals is a clock signal.

12. A method in accordance with claim 10, wherein said one of said first plurality of control signals is an interrupt signal.

13. A method in accordance with claim 10, wherein said one of said first plurality of control signals is a write strobe signal.

14. A method in accordance with claim 10, wherein said one of said first plurality of control signals is a read strobe signal.

15. A method in accordance with claim 10, wherein said one of said first plurality of control signals is a data ready signal.

16. A multiple processor system comprising:
   a first processor having a plurality of terminals for receiving a first plurality of control signals coupled thereto;
   a second processor;
   a multiprocessor logic controller for preventing reception of at least one of said first plurality of control signals by said first processor and for substituting at least one of a second plurality of control signals in place of said one of said first plurality of control signals, and for selectively enabling said first processor and said second processor, respectively, wherein, during said preventing reception, said multiprocessor logic controller assigns a second memory address space to said second processor and a first memory address space to said first processor, and wherein said second memory address space is non-accessible to said first processor;
   wherein said first processor, said second processor and said multiprocessor logic controller are integrated on a system common motherboard.

17. In a computer system including a memory and a central processor unit, said central processor unit having respective address signals, data signals and a plurality of control signals coupled thereto, said plurality of control signals provided to/from said central processor unit on a respective plurality of control signal lines including a first control signal line being one of said plurality of control signal lines, said first control signal line including a first control signal, said computer system having at least one critical program area stored in said memory, a method for enhancing the security of said computer system, said method comprising:
   providing a second processor having an associated logic controller;
   detecting start up of said computer system;
   capturing control of said central processing unit by halting said central processor unit in response to said step of detecting start up of said computer system; wherein said halting step includes sending a hold signal to said central processor unit from said logic controller; and wherein, in response to said hold signal, said central processor unit places one or more circuits associated with the central processor unit into a high impedance state;
   verifying a first critical program area in said memory with said second processor;
   releasing control of said central processor unit by said logic controller to run said critical program if said first critical program area is verified;
   wherein said second processor, said logic controller, and operation of circuitry associated with said second processor and said logic controller are invisible to all other portions of said computer system, with the exception of a BIOS extension associated with said logic controller, subsequent said step of releasing control.

18. A method in accordance with claim 17, wherein, in response to said hold signal, said central processor unit places one or more circuits associated with the address signals of the central processor unit in a high impedance state.

19. method in accordance with claim 17, wherein, in response to said hold signal, said central processor unit places one or more circuits associated with the data signals of the central processor unit in a high impedance state.

20. A method in accordance with claim 17, wherein said central processor unit includes a clock signal input for receiving a clock signal, and wherein said step of capturing control of said central processor unit by said logic controller responsive to said step of detecting start up of said computer system comprises:
   intercepting said clock signal to said central processor unit.

21. A method in accordance with claim 17, wherein said step of capturing control of said central processor unit by said logic controller responsive to said step of detecting start up of said computer system comprises:
   intercepting said first control signal.

22. A method in accordance with claim 21, wherein said step of intercepting said first control signal comprises:
   redirecting said first control signal line from said central processor unit to said second processor thereby intercepting said first control signal; and
   substituting a second control signal to/from said second processor in place of said first control signal.

23. A method in accordance with claim 22, wherein said step of releasing control of said central processor unit to run said critical program, includes the step of further redirecting said first control signal line such that control of said central processor unit is released by said logic controller.

24. A method in accordance with claim 17, wherein said step of capturing control of said central processor unit by said logic controller responsive to said step of detecting start up of said computer system comprises:

intercepting an interrupt vector address signal.

25. A method in accordance with claim 17, wherein said step of capturing control of said central processor unit by said logic controller responsive to said step of detecting start up of said computer system comprises:

intercepting a data strobe signal.

26. A method in accordance with claim 17, wherein said step of capturing control of said central processor unit by said logic controller responsive to said step of detecting start up of said computer system comprises:

intercepting an address strobe signal.

27. A method in accordance with claim 17, wherein said step of capturing control of said central processor unit by said logic controller responsive to said step of detecting start up of said computer system comprises:

intercepting a data ready signal.

28. A method in accordance with claim 17, wherein said step of detecting start up of said computer system comprises:

detecting power up of said computer system.

29. A method in accordance with claim 17, wherein said step of detecting start up of said computer system comprises:

detecting hard system reset of said computer system.

30. In a computer system including a memory and a central processor unit, said central processor unit having respective address signals, data signals and a plurality of control signals coupled thereto, said plurality of control signals provided to/from said central processor unit on a respective plurality of control signal lines including a first control signal line being one of said plurality of control signal lines, said first control signal line including a first control signal, said computer system having at least one critical program area stored in said memory, an apparatus for enhancing the security of said computer system, said apparatus comprising:

a second processor having an associated logic controller;

means for detecting start up of said computer system;

wherein the logic controller captures control of said central processing unit by halting said central processor unit in response to said detecting start up of said computer system; wherein said logic controller halts said central processor by sending a hold signal to said central processor unit; and wherein, in response to said hold signal, said central processor unit places one or more circuits associated with the central processor unit into a high impedance state;

means for verifying a first critical program area in said memory with said second processor;

means for releasing control of said central processor unit by said logic controller to run said critical program if said first critical program area is verified;

wherein said second processor, said logic controller, and operation of circuitry associated with said second processor and said logic controller are invisible to all other portions of said computer system, with the exception of a BIOS extension associated with said logic controller, subsequent said releasing control.

31. An apparatus in accordance with claim 30, wherein, in response to said hold signal, said central processor unit places one or more circuits associated with the address signals of the central processor unit in a high impedance state.

32. An apparatus in accordance with claim 30, wherein, in response to said hold signal, said central processor unit places one or more circuits associated with the data signals of the central processor unit in a high impedance state.

33. An apparatus in accordance with claim 30, wherein said central processor unit includes a clock signal input for receiving a clock signal, further comprising:

means for intercepting said clock signal to said central processor unit.

34. An apparatus in accordance with claim 30, further comprising:

means for intercepting said first control signal.

35. An apparatus in accordance with claim 30, further comprising:

means for redirecting said first control signal line from said central processor unit to said second processor thereby intercepting said first control signal; and means for substituting a second control signal to/from said second processor in place of said first control signal.

36. An apparatus in accordance with claim 35, wherein said means for releasing control of said central processor unit to run said critical program, includes means for further redirecting said first control signal line such that control of said central processor unit is released by said logic controller.

37. An apparatus in accordance with claim 30, further comprising:

means for intercepting an interrupt vector address signal.

38. An apparatus in accordance with claim 30, further comprising:

means for intercepting a data strobe signal.

39. An apparatus in accordance with claim 30, further comprising:

means for intercepting an address strobe signal.

40. An apparatus in accordance with claim 30, further comprising:

means for intercepting a data ready signal.

41. An apparatus in accordance with claim 30, wherein said means for detecting start up of said computer system comprises:

means for detecting power up of said computer system.

42. An apparatus in accordance with claim 30, wherein said means for detecting start up of said computer system comprises:

means for detecting hard system reset of said computer system.

* * * * *